(12) United States Patent
Miwa et al.

(10) Patent No.: US 10,633,034 B2
(45) Date of Patent: Apr. 28, 2020

(54) FENDER LINER STRUCTURE

(71) Applicant: TOYOTA JIDOSHA KABUSHIKI KAISHA, Toyota-shi, Aichi-ken (JP)

(72) Inventors: Masaki Miwa, Nagakute (JP); Masahiro Sugiura, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/193,489

(22) Filed: Nov. 16, 2018

(65) Prior Publication Data

US 2019/0176899 A1 Jun. 13, 2019

(30) Foreign Application Priority Data

Dec. 11, 2017 (JP) .................. 2017-236646

(51) Int. Cl.
| | |
|---|---|
| *B60K 11/00* | (2006.01) |
| *B62D 25/18* | (2006.01) |
| *B60K 11/08* | (2006.01) |
| *B60K 11/04* | (2006.01) |
| *B62D 25/16* | (2006.01) |
| *B60K 6/22* | (2007.10) |

(52) U.S. Cl.
CPC .............. *B62D 25/18* (2013.01); *B60K 11/04* (2013.01); *B60K 11/08* (2013.01); *B62D 25/161* (2013.01); *B60K 6/22* (2013.01)

(58) Field of Classification Search
CPC ...... B62D 35/02; B62D 25/18; B62D 25/161; B60K 11/04; B60K 11/08
See application file for complete search history.

(56) References Cited

U.S. PATENT DOCUMENTS

| | | | | |
|---|---|---|---|---|
| 9,561,827 B2 * | 2/2017 | Parry-Williams | ...... | B62D 37/02 |
| 2007/0023238 A1 * | 2/2007 | Ramsay | .................... | B60T 5/00 |
| | | | | 188/71.6 |
| 2007/0182207 A1 * | 8/2007 | Nakaya | ................ | B62D 25/182 |
| | | | | 296/180.1 |
| 2008/0150273 A1 * | 6/2008 | Sugiyama | ............ | B62D 25/161 |
| | | | | 280/851 |
| 2009/0025993 A1 * | 1/2009 | Hines | ..................... | B62D 35/00 |
| | | | | 180/68.3 |
| 2010/0090503 A1 * | 4/2010 | Uchino | .................. | B62D 25/16 |
| | | | | 296/198 |

(Continued)

FOREIGN PATENT DOCUMENTS

JP 2015-155226 A 8/2015

*Primary Examiner* — Hau V Phan
(74) *Attorney, Agent, or Firm* — Oliff PLC

(57) ABSTRACT

A fender liner structure is disposed in a wheel house of a front wheel of a vehicle. The vehicle includes a sub radiator disposed on a vehicle front side of a fender liner. The fender liner structure includes a liner body portion curving in an arch shape to cover the front wheel from above and a lower wall portion extending to the front of the vehicle from a lower end of the liner body portion on the vehicle front side. The liner body portion includes a first vent hole penetrating a vehicle front side part of the liner body portion. The lower wall portion includes a second vent hole penetrating a vehicle rear side end portion of the lower wall portion in an upper-lower direction. The lower wall portion includes a negative pressure generation part configured to generate a negative pressure under the second vent hole.

9 Claims, 24 Drawing Sheets

(56) References Cited

U.S. PATENT DOCUMENTS

| | | | | |
|---|---|---|---|---|
| 2011/0214568 A1* | 9/2011 | Krantz | ............... | F16D 65/0031 |
| | | | | 95/273 |
| 2012/0071075 A1* | 3/2012 | Wolf | ...................... | B60T 5/00 |
| | | | | 454/162 |
| 2015/0225026 A1* | 8/2015 | Ohira | .................... | B62D 25/08 |
| | | | | 296/180.1 |
| 2015/0266522 A1* | 9/2015 | Ishikawa | ............... | B62D 35/02 |
| | | | | 296/180.1 |
| 2017/0073024 A1* | 3/2017 | Umemoto | ........... | B62D 25/161 |
| 2017/0355333 A1* | 12/2017 | Kishima | ................ | B60R 19/48 |

* cited by examiner

FIG. 6A
FIG. 6B
RELATED ART
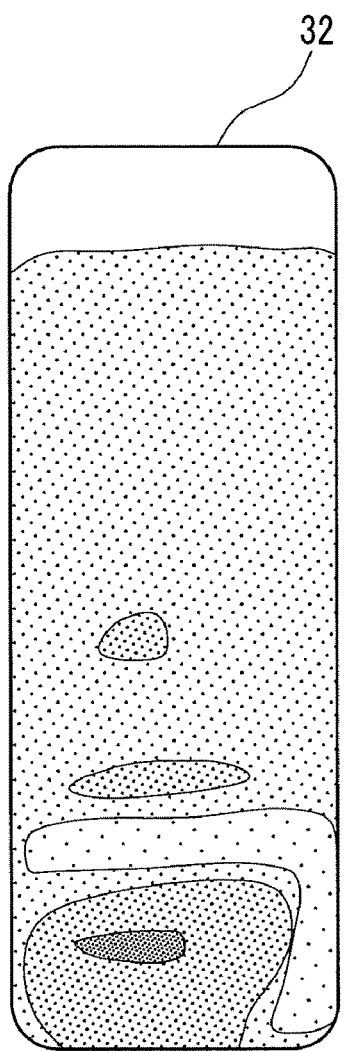
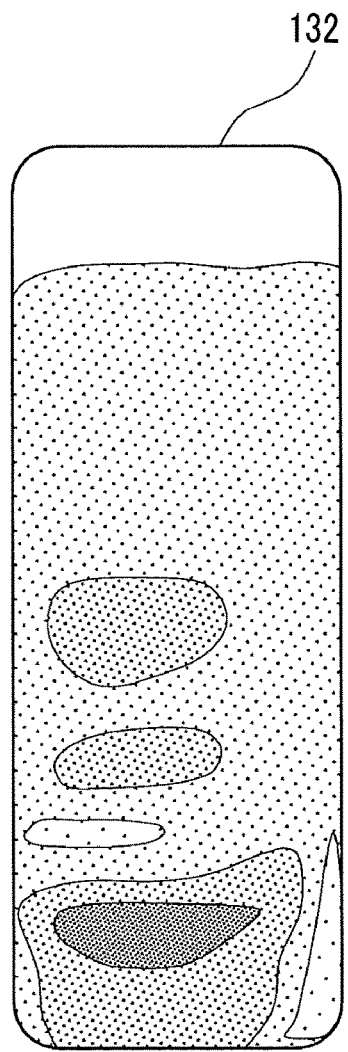
$C_X$ SMALL ⟵⟶ $C_X$ LARGE     $C_X$ SMALL ⟵⟶ $C_X$ LARGE FIG. 11
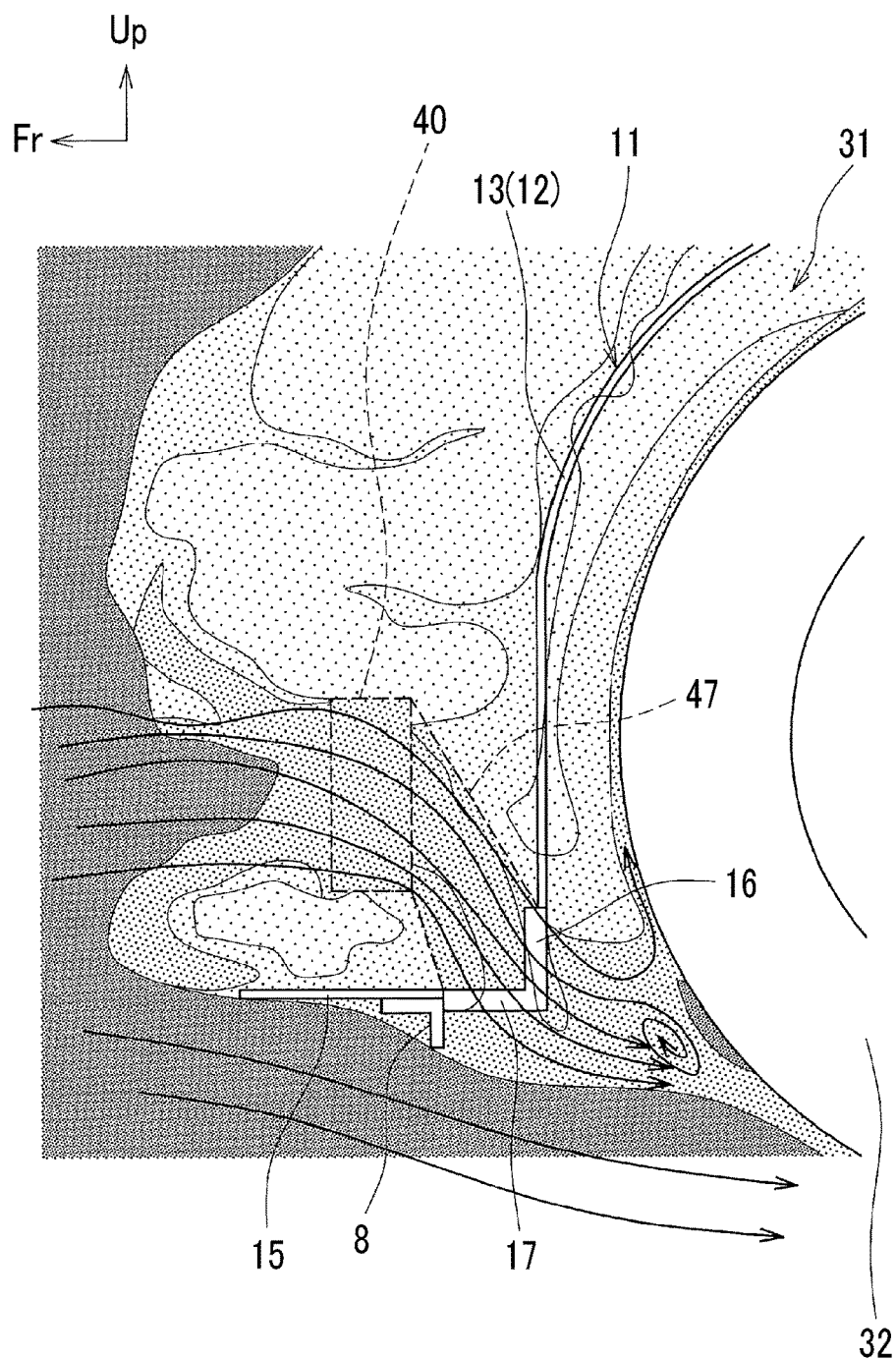
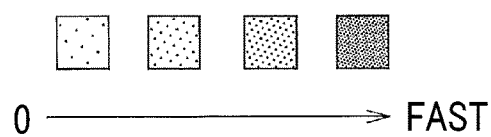
0 ⟶ FAST FIG. 12
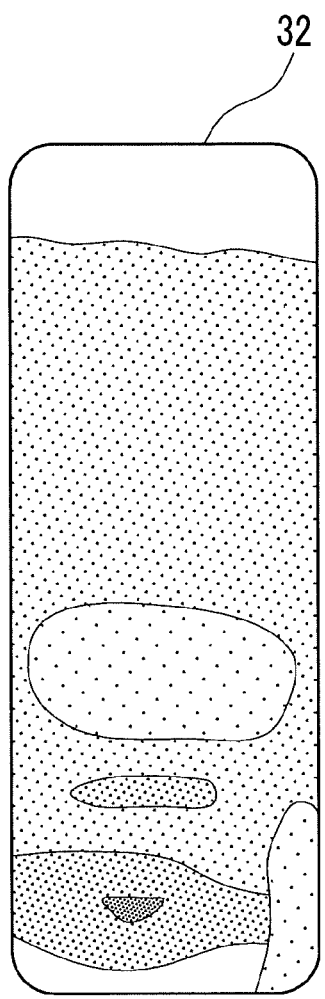
Up
→ Out(Lf)
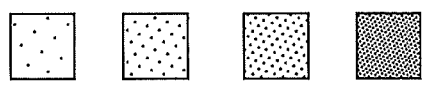
$C_X$ SMALL ⟵⟶ $C_X$ LARGE

FIG. 16
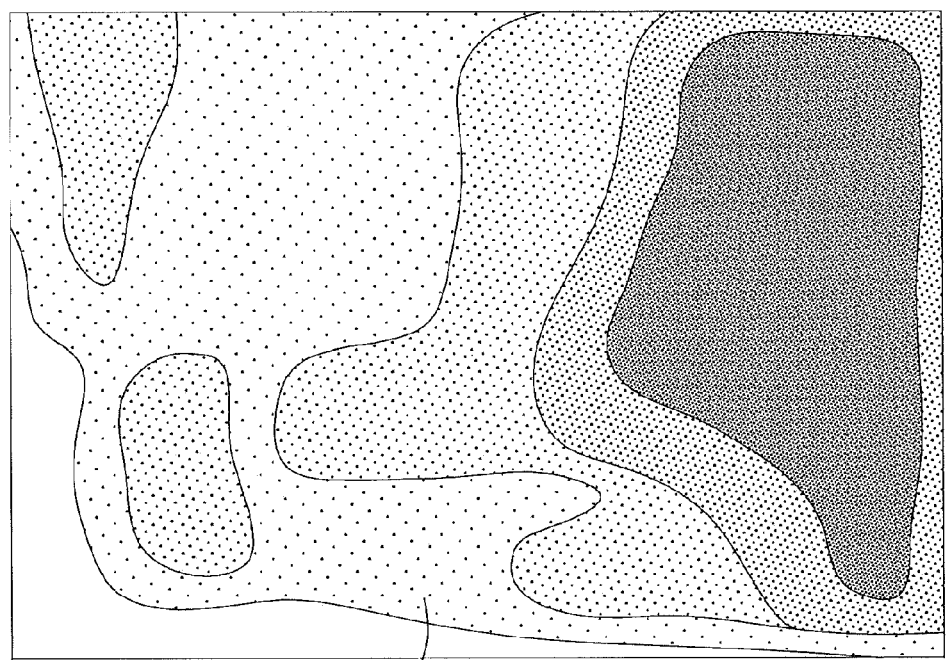
40
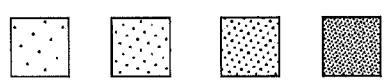
0 ⟶ FAST

FIG. 24
RELATED ART
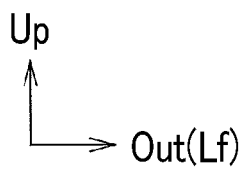
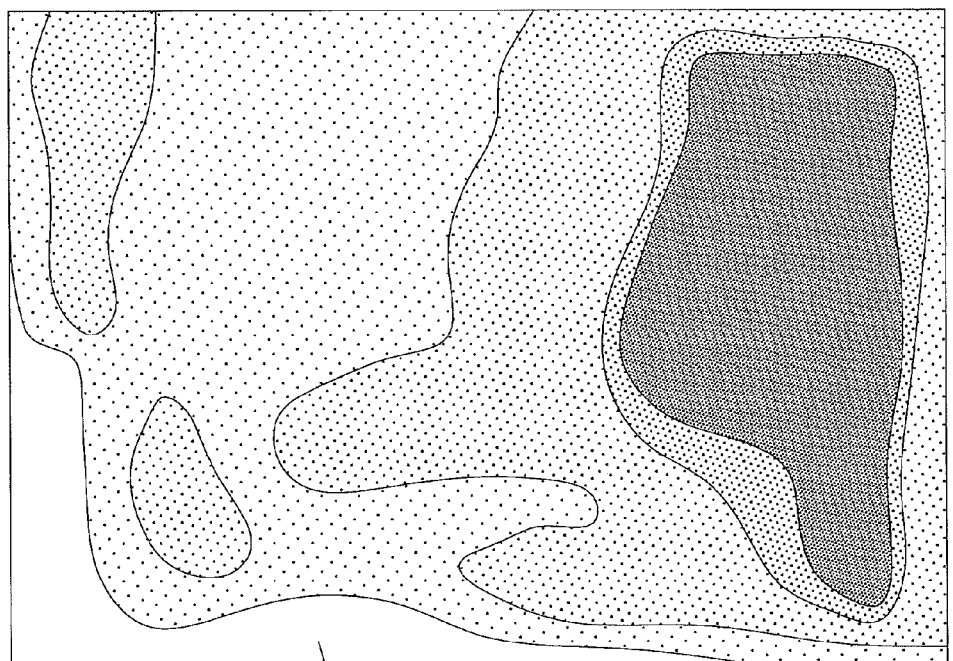
140
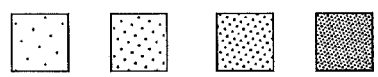
0 ⟶ FAST

FENDER LINER STRUCTURE

INCORPORATION BY REFERENCE

The disclosure of Japanese Patent Application No. 2017-236646 filed on Dec. 11, 2017 including the specification, drawings and abstract is incorporated herein by reference in its entirety.

BACKGROUND

1. Technical Field

The disclosure relates to a fender liner structure and, more particularly, to a fender liner structure in which a sub radiator is disposed in front of a fender liner disposed in the wheel house of a front wheel of a vehicle.

2. Description of Related Art

Known in the related art is a sub radiator mounted separately from a main radiator for engine cooling. In a conventional vehicle, for example, the sub radiator is mounted for cooling of a coolant lower in temperature than an engine coolant. In a hybrid vehicle, for example, the sub radiator is mounted for cooling of electronic equipment such as an inverter.

Normally, in the sub radiator as described above, the coolant is cooled by heat exchange with air taken in from an air intake port formed in a front bumper or the like. As an example, Japanese Unexamined Patent Application Publication No. 2015-155226 (JP 2015-155226 A) discloses a configuration in which the sub radiator is disposed in front of a fender liner provided in the wheel house of a front wheel of a vehicle and the air that has passed through the sub radiator is discharged into the wheel house from a vent hole formed in the fender liner.

SUMMARY

As in JP 2015-155226 A, making the air intake port, the sub radiator, and the vent hole relatively large for an increase in the amount of air passing through the sub radiator is conceivable as a method for enhancing the cooling performance of the sub radiator disposed in front of the fender liner.

However, this method has problems in that design is impaired by the relatively large air intake port, an increase in vehicle body weight and manufacturing cost results from the relatively large sub radiator, and a decline in aerodynamic performance arises as the air resistance that is applied to the front wheel increases due to the relatively large vent hole.

Also conceivable is a method for forcibly increasing the amount of air passing through the sub radiator by means of a separate blower such as a fan with the sizes of the sub radiator and so on remaining the same. However, this method is also problematic in that this method leads to an increase in vehicle body weight and manufacturing cost.

Regarding a wheel house provided with a vent hole-formed fender liner, a relatively small vent hole is conceivable as a method for reducing the air resistance that is applied to a front wheel. Here, however, the amount of air passing through the sub radiator decreases as the amount of air discharge from the vent hole decreases, and thus the cooling performance of the sub radiator is cannot be ensured with ease, which is a problem.

As described above, the cooling performance of the sub radiator disposed in front of the vent hole-formed fender liner and the aerodynamic performance of a vehicle provided with the fender liner have a relationship in which one declines when the other is improved.

The disclosure provides a technique with which a high level of aerodynamic performance improvement and a high level of cooling performance for a sub radiator can be achieved at the same time with design remaining intact and an increase in weight and cost suppressed in a structure in which the sub radiator is disposed in front of a fender liner.

An aspect of the disclosure relates to a fender liner structure. In the fender liner structure, air discharge to the lower side of a front wheel is promoted by a vent hole being formed in the lower wall portion of a fender liner and the air that has passed through a sub radiator being pulled downwards by means of negative pressure generation under the vent hole penetrating a vehicle rear side end portion of the lower wall portion in an upper-lower direction.

Specifically, the fender liner structure according to the aspect of the disclosure is disposed in the wheel house of a front wheel of a vehicle. The vehicle includes a sub radiator disposed in front of the fender liner.

The fender liner structure includes a liner body portion curving in an arch shape to cover the front wheel from above and a lower wall portion extending to the front of the vehicle from the lower end of the liner body portion on the vehicle front side. The liner body portion includes a first vent hole penetrating a vehicle front side part of the liner body portion in a front-rear direction. The lower wall portion includes a second vent hole penetrating a vehicle rear side end portion of the lower wall portion in an upper-lower direction. The lower wall portion includes a negative pressure generation part configured to generate a negative pressure under the second vent hole.

According to this configuration, the liner body portion includes the first vent hole penetrating the vehicle front side part of the liner body portion in the front-rear direction. Accordingly, part of the air that has passed through the sub radiator flows into the wheel house through the first vent hole.

In addition, the lower wall portion of the fender liner includes the second vent hole penetrating the vehicle rear side end portion of the lower wall portion in the upper-lower direction and the negative pressure generation part generating a negative pressure is disposed on the lower side of the second vent hole. Accordingly, a negative pressure is generated under the second vent hole. Once a negative pressure is generated under the second vent hole as described above, another part of the air that has passed through the sub radiator is pulled downwards. Accordingly, air discharge from the second vent hole is promoted as compared with a case where simply a vent hole is formed in the lower wall portion.

As a result, it is possible to obtain a discharge effect beyond simple discharge area expansion, that is, discharge area expansion from the area of the first vent hole to the combined area of the first vent hole and the second vent hole.

The second vent hole is formed in the vehicle rear side end portion of the lower wall portion, that is, in the vicinity of the vehicle front side part of the liner body portion. Accordingly, most of the air that has passed through the first vent hole flows downwards, drawn by the fast downward flow from the second vent hole by the negative pressure. As a result, the amount of the air flowing through the vehicle lower side of the front wheel increases. When most of the air that should flow to the vehicle front side of the front wheel through the first vent hole flows to the lower side of the front wheel as described above, the amount of air on the vehicle front side of the front wheel in the wheel house decreases and a decline in pressure occurs as a result. Accordingly, the air resistance that is applied to the front wheel decreases, and thus aerodynamic performance improvement can be achieved.

Furthermore, once the pressure in the wheel house decreases as described above, the pressures in front of and behind the fender liner become different from each other. This pressure difference leads to a natural increase in the amount of discharge from the first vent hole facing the wheel house. As a result, the discharge effect beyond discharge area expansion can be obtained to a larger extent and the amount of air passing through the sub radiator can be increased.

As described above, according to the aspect of the disclosure, the air resistance applied to the front wheel is decreased by an increase in the discharge amount of air flowing through the lower side of the front wheel as well as an increase in the amount of air passing through the sub radiator even without the air intake port and the sub radiator being made relatively large or a separate blower or the like being added. Accordingly, a high level of aerodynamic performance improvement and a high level of cooling performance for the sub radiator can be achieved at the same time with design remaining intact and an increase in weight and cost suppressed.

In the disclosure, it is possible to obtain a discharge effect beyond simple discharge area expansion. This means a discharge amount equivalent to that of a fender liner structure in which, for example, the vent hole is formed solely at the vehicle front side part of the liner body portion of the fender liner (such as the fender liner structure according to the related art) can be ensured, even when the discharge area or the like is relatively small, insofar as the configuration of the disclosure is adopted. Accordingly, a cooling performance equivalent to the cooling performance of the sub radiator of the fender liner structure according to the related art can be ensured, even when, for example, the air intake port and the first vent hole are small, in a case where aerodynamic performance improvement is the main focus.

In the fender liner structure according to the aspect of the disclosure, the first vent hole may be formed in a lower end portion of the vehicle front side part of the liner body portion such that an upper end of the first vent hole is positioned lower than a center of the front wheel.

According to the aspect of the disclosure, the first vent hole is formed in the lower end portion of the vehicle front side part of the liner body portion such that the upper end is positioned lower than the center of the front wheel. In other words, a relatively small first vent hole is formed in the lower end portion of the vehicle front side part of the liner body portion. Accordingly, the amount of air flowing into the wheel house can be further decreased. Therefore, the air resistance that is applied to the front wheel can be further decreased.

Also, in this configuration, the amount of discharge from the first vent hole decreases as compared with a case where, for example, a vent hole is formed at the vehicle front side part of the liner body portion such that the upper end of the vent hole is higher than the center of the front wheel. Still, the decrement can be offset by the amount of discharge from the second vent hole, and thus the amount of air passing through the sub radiator can be maintained. As a result, a cooling performance equivalent to the cooling performance of the sub radiator of the fender liner structure according to the related art can be ensured even in a case where the first vent hole is relatively small. Accordingly, aerodynamic performance improvement can be achieved and the cooling performance of the sub radiator can be ensured at the same time by means of the simple configuration in which the relatively small first vent hole is formed in the lower end portion of the vehicle front side part of the liner body portion.

In the fender liner structure according to the aspect of the disclosure, the vehicle may be provided with an air intake port taking in cooling air for the sub radiator in front of the sub radiator. The size of the air intake port may be relatively smaller than in a case where the second vent hole is not formed.

According to this configuration, the air intake port is relatively small, and thus the amount of air hitting the sub radiator can be reduced. As a result, the air resistance that is applied to the sub radiator can be reduced. This is combined with the above-described reduction in the air resistance applied to the front wheel to lead to further aerodynamic performance improvement. In addition, the design of the front portion of the vehicle can be enhanced by the relatively small air intake port.

In this configuration, air intake from the air intake port is not easy because of the relatively small air intake port. Still, air discharge from the second vent hole is promoted by negative pressure generation, and thus the difficulty of intake can be offset. Accordingly, the amount of air passing through the sub radiator can be maintained. Therefore, even in a case where the air intake port is relatively small, the cooling performance of the sub radiator can be ensured.

As a result, design and aerodynamic performance improvement can be achieved and the cooling performance of the sub radiator can be ensured at the same time by means of the simple configuration in which the air intake port is relatively small.

In the fender liner structure according to the aspect of the disclosure, the liner body portion may include a third vent hole extending in the upper-lower direction through the liner body portion in an end portion of the vehicle front side part of the liner body portion on a vehicle width direction outer side of the vehicle.

In a wheel house that is provided with a vent hole-formed fender liner, the flow of the air that has flowed into the wheel house through the vent hole is disturbed. Then, the disturbed air may be blown out to the vehicle width direction outer side of the vehicle from the vehicle front side of the front wheel (between the front wheel and the vehicle front side part of the fender liner). In this configuration, the third vent hole extending in the upper-lower direction is formed in the end portion of the vehicle front side part of the liner body portion on the vehicle width direction outer side of the vehicle in this regard. Accordingly, the air that has passed through the sub radiator can be discharged from the third vent hole before flowing into the wheel house and flow rearwards along the side surface of the front wheel on the vehicle width direction outer side of the vehicle. As a result, the air flow in the wheel house is not disturbed and the air around the front wheel is rectified. Accordingly, the air resistance applied to the front wheel can be reduced. In addition, the air that has passed through the sub radiator smoothly flows rearwards through the third vent hole and along the side surface of the front wheel on the vehicle width direction outer side of the vehicle, and thus the amount of air passing through the sub radiator can be increased and the cooling performance of the sub radiator can be further improved as a result.

As described above, in the fender liner structure according to the aspect of the disclosure that has the first vent hole, the second vent hole, and the negative pressure generation part as basic configurations, a high level of aerodynamic performance improvement and a high level of cooling performance for the sub radiator can be achieved at the same time and the performance of either the first vent hole or the air intake port can be emphasized, without any decline in the performance of both, by adjustment of the sizes of the first vent hole and the air intake port and so on. This can be realized by adoption of various negative pressure generation parts as well.

Specifically, in a case where the cooling performance of the sub radiator is emphasized, for example, the negative pressure generation part in the fender liner structure according to the aspect of the disclosure may include air spats attached to a vehicle front side of the second vent hole beneath a lower surface of the lower wall portion and having a wind receiving plate extending downwards.

According to this configuration, a vortex is likely to be generated behind the wind receiving plate, that is, under the second vent hole. As a result, the negative pressure generated under of the second vent hole can be increased, and thus the cooling performance of the sub radiator can be enhanced by further promoting air discharge from the second vent hole. Also in this case, the air resistance that is applied to the front wheel decreases on the same principle as above, and thus no decline in aerodynamic performance arises as compared with the fender liner structure according to the related art.

In a case where the aerodynamic performance is emphasized, for example, the negative pressure generation part in the fender liner structure according to the aspect of the disclosure may include an inclined member attached to a vehicle front side of the second vent hole beneath a lower surface of the lower wall portion and having an inclined surface inclined downwards from the lower surface of the lower wall portion toward a vehicle rear side.

According to this configuration, the traveling wind that flows through the lower side of the lower wall portion can be smoothly flowed rearwards (to the lower side of the front wheel) along the inclined surface of the inclined member that is inclined downwards. As a result, further aerodynamic performance improvement can be achieved. Also in this case, a vortex is generated behind the inclined member, that is, under of the second vent hole on the same principle as above, and thus no decline in the cooling performance of the sub radiator arises as compared with the fender liner structure according to the related art.

In addition, the negative pressure generation part may be disposed integrally with the fender liner by a shape being devised for the lower wall portion or the like as well as by a separate member such as the air spats and the inclined member being attached to the lower wall portion.

Specifically, in the fender liner structure according to the aspect of the disclosure, the second vent hole may include a plurality of fins guiding air and inclined downwards toward a vehicle rear side. A part where the fin extends downwards beyond a lower surface of the lower wall portion may constitute the negative pressure generation part.

According to this configuration, a negative pressure can be generated behind the extending part of each fin, that is, under the second vent hole with the number of parts reduced. As a result, air discharge from the second vent hole can be promoted and the cooling performance of the sub radiator can be enhanced.

In the fender liner structure according to the aspect of the disclosure, the lower wall portion may include a vertical wall portion extending downwards from a vehicle front side of the second vent hole and an inclined wall portion inclined downwards from a tip portion of the lower wall portion toward a vehicle rear side and connected to a lower end of the vertical wall portion. The vertical wall portion and the inclined wall portion may constitute the negative pressure generation part.

According to this configuration, the traveling wind can be smoothly flowed rearwards (to the lower side of the front wheel) along the inclined wall portion with the number of parts reduced. As a result, further aerodynamic performance improvement can be achieved. Also in this case, a vortex is generated behind the vertical wall portion, that is, under the second vent hole on the same principle as above, and thus the cooling performance of the sub radiator can be improved.

The fender liner structure according to the aspect of the disclosure may further include a duct disposed behind the sub radiator and guiding air to the first vent hole and the second vent hole after passage of the air through the sub radiator.

According to this configuration, the air that has passed through the sub radiator can be efficiently guided to the first vent hole and the second vent hole via the duct disposed behind the sub radiator.

As described above, with the fender liner structure according to the aspect of the disclosure, a high level of aerodynamic performance improvement and a high level of cooling performance for a sub radiator can be achieved at the same time with design remaining intact and an increase in weight and cost suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a diagram schematically illustrating the $C_X$ value distribution in a front tire and relates to the fender liner structure according to the first embodiment;

FIG. 6B is a diagram schematically illustrating the $C_X$ value distribution in a front tire and relates to a fender liner structure according to the related art;

FIG. 11 is a diagram schematically illustrating the flow velocity distribution around the fender liner;

FIG. 12 is a diagram schematically illustrating the $C_x$ value distribution in a front tire;

FIG. 16 is a diagram schematically illustrating a sub radiator passage wind amount;

FIG. 24 is a diagram schematically illustrating the sub radiator passage wind amount of the fender liner structure according to the related art.

DETAILED DESCRIPTION OF EMBODIMENTS

Figure 1:
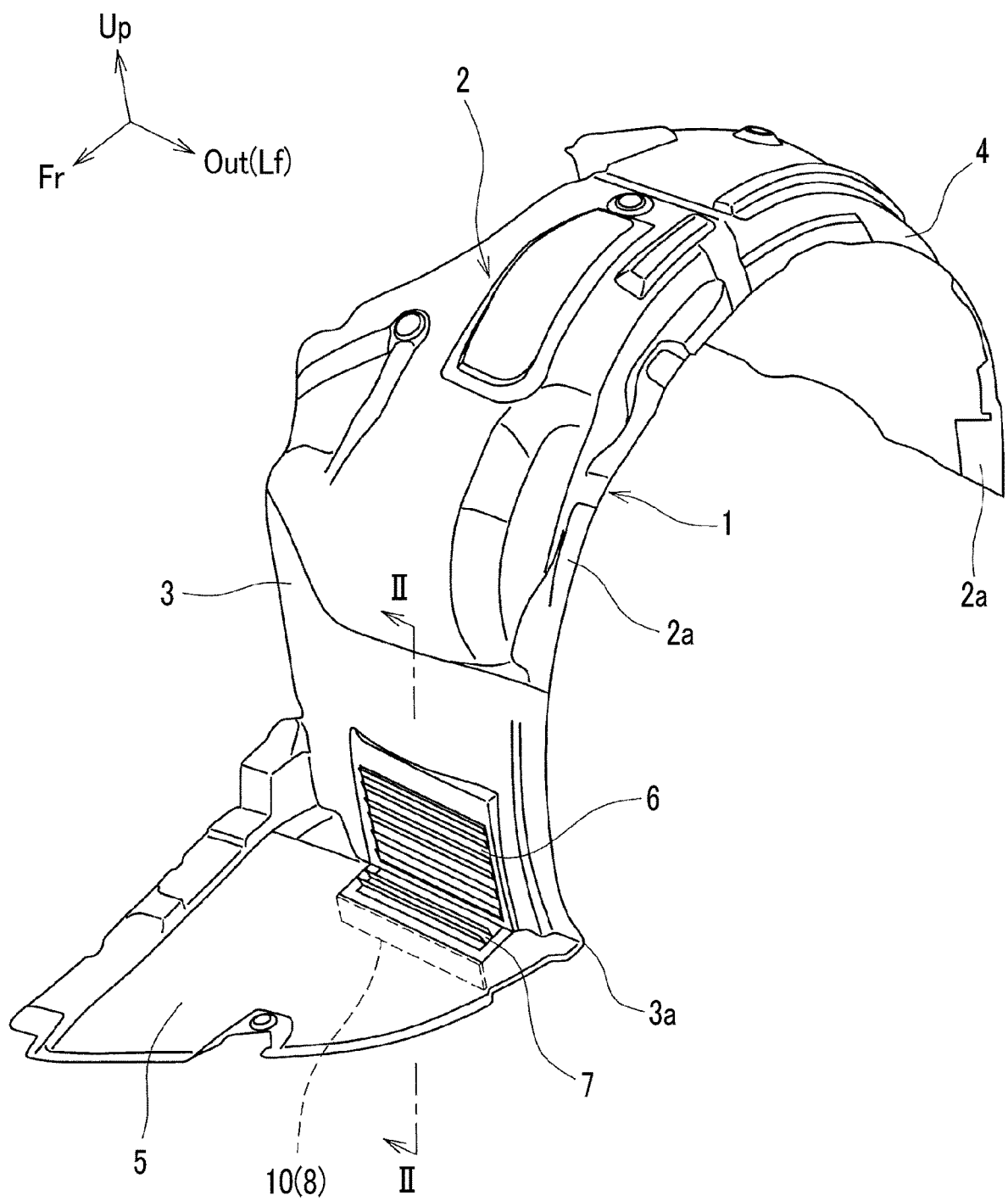
FIG. 1 is a perspective view schematically illustrating a fender liner according to a first embodiment of the disclosure.

Hereinafter, embodiments of the disclosure will be described with reference to accompanying drawings. In the following description, the front side (front) means the front side (front) in the front-rear direction of a vehicle and the rear side (rear) means the rear side (rear) in the front-rear direction of the vehicle. In the drawings, the arrow Up indicates the upper side of the vehicle, the arrow Fr indicates the front side in the front-rear direction of the vehicle, and the arrow Out (Lf) indicates an outer side (the left side) of the vehicle in the width direction of the vehicle.

First Embodiment

Figure 2:
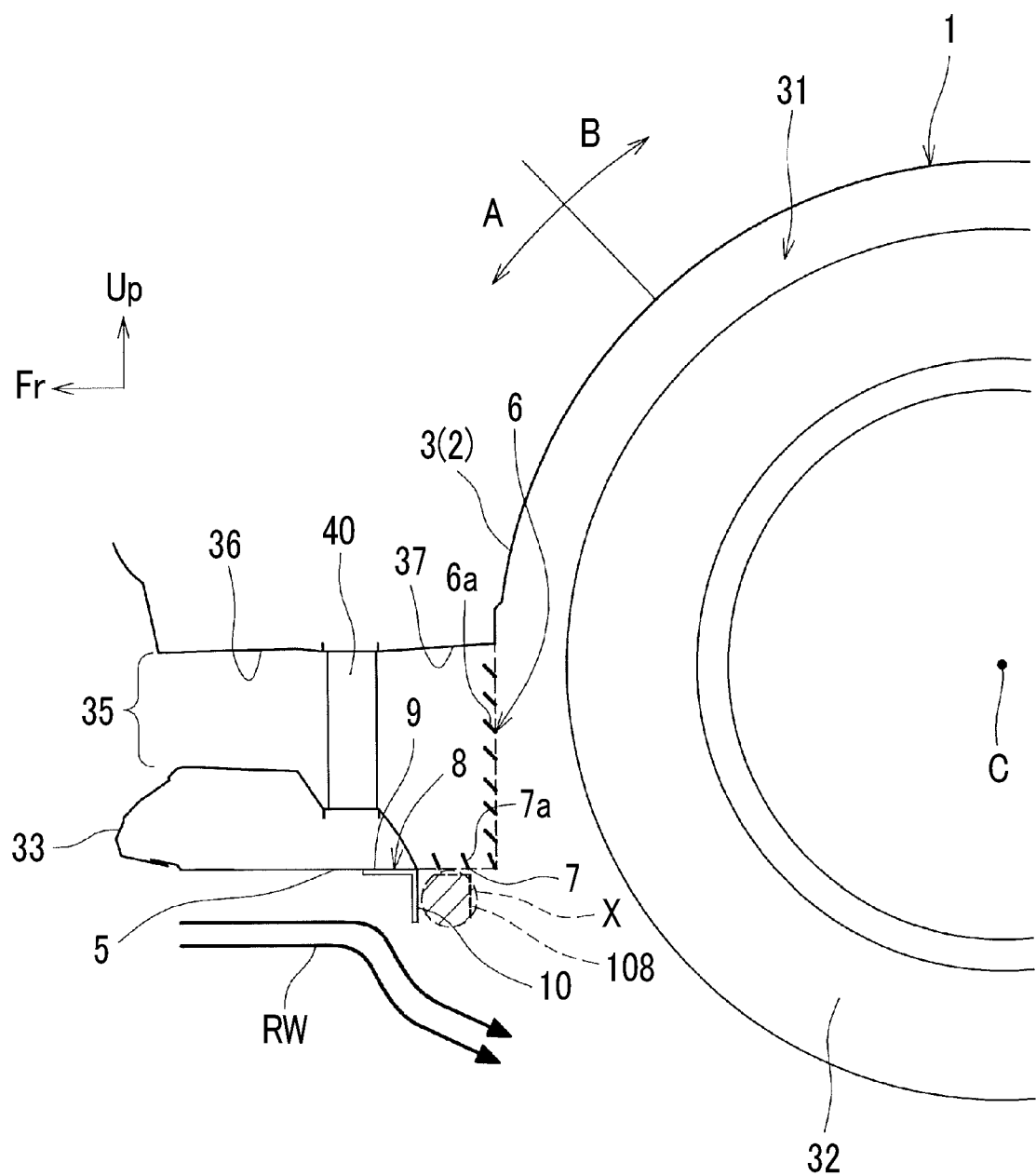
FIG. 2 is a sectional view schematically illustrating a fender liner structure and corresponds to the II-II line in FIG. 1.
Figure 3:
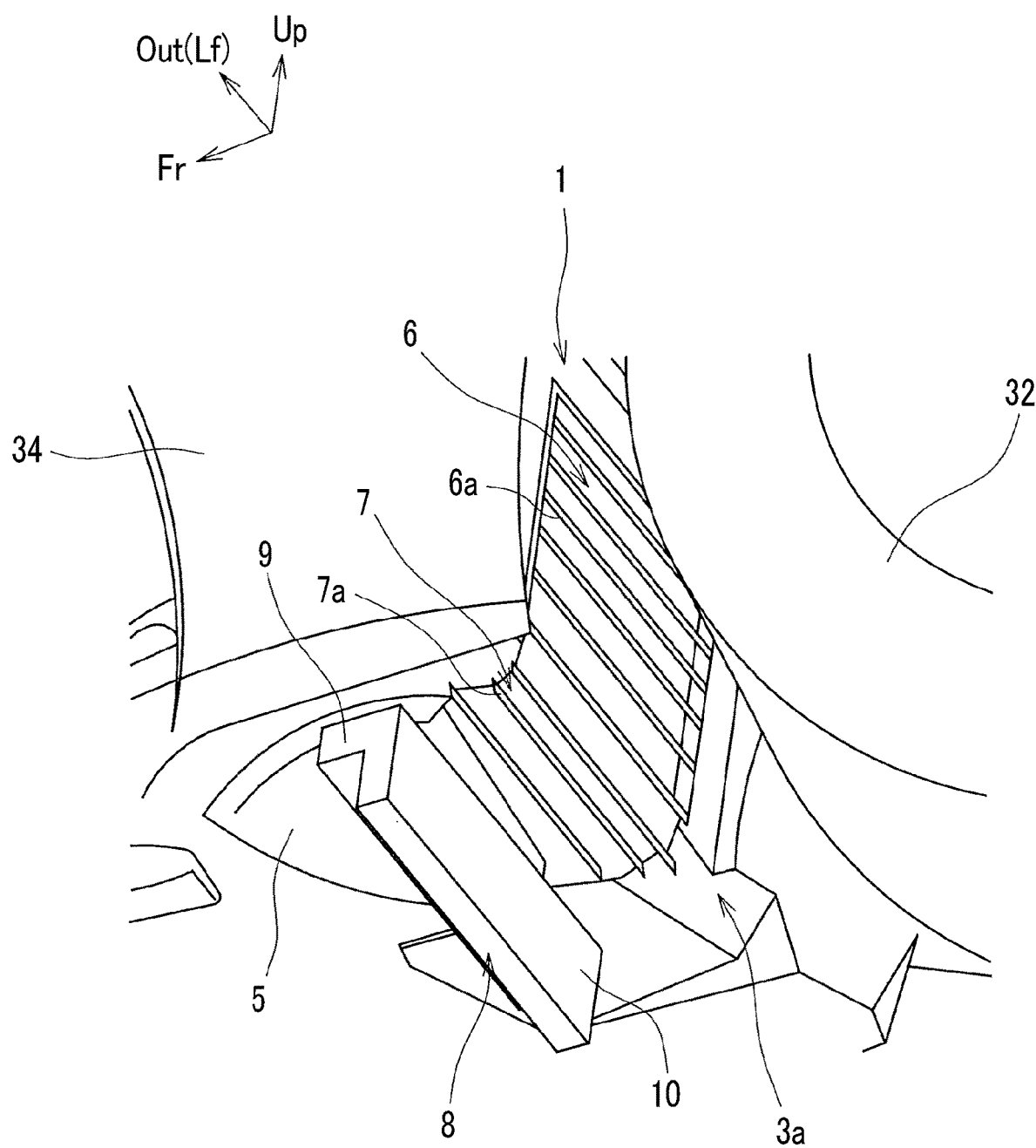
FIG. 3 is a perspective view in which a liner body portion and a lower wall portion are viewed diagonally from behind and from below.

FIG. 1 is a perspective view schematically illustrating a fender liner 1 according to a first embodiment. FIG. 2 is a sectional view schematically illustrating a fender liner structure and corresponds to the II-II line in FIG. 1. FIG. 3 is a perspective view in which a liner body portion 2 and a lower wall portion 5 are viewed diagonally from behind and from below. The fender liner 1 and so on have thickness in reality. In the illustration of FIG. 2, however, the thickness of a relatively thin member is appropriately omitted for ease of viewing. In the fender liner structure illustrated in FIG. 2, a sub radiator 40 is disposed in front of a wheel house 31 of a front tire (front wheel) 32. The wheel house 31 is provided with the fender liner 1 illustrated in FIG. 1. The fender liner 1 on the left side will be described below. A fender liner on the right side is identical in configuration to the fender liner 1, and thus the fender liner on the right side will not be described here.

Fender Liner Structure

As illustrated in FIG. 1, the fender liner 1 is provided with the liner body portion 2 curving in an arch shape to cover the front tire 32 from above and the lower wall portion 5 extending to the front of the vehicle from a lower end 3a of the liner body portion 2 on the vehicle front side. The liner body portion 2 has a vehicle front side part 3 covering the front tire 32 from the upper end of the front tire 32 to the front side and a vehicle rear side part 4 covering the front tire 32 from the upper end of the front tire 32 to the rear side. The fender liner 1 is attached to, for example, a bumper panel 34 (refer to FIG. 3) and a fender panel (not illustrated) via, for example, a flange portion 2a formed in the end portion of the vehicle on the vehicle width direction outer side (left side). More specifically, the parts of the lower wall portion 5 and the liner body portion 2 on the A side in FIG. 2 are attached to the bumper panel 34 by a clip or the like and the part of the liner body portion 2 on the B side in FIG. 2 is attached to the fender panel by a clip or the like.

A first vent hole 6 is formed at the vehicle front side part 3 of the liner body portion 2, and the first vent hole 6 penetrates the liner body portion 2 in the front-rear direction. More precisely, the first vent hole 6 is provided with a plurality of fins 6a guiding air and inclined downwards toward the vehicle rear side, and thus the first vent hole 6 is formed to penetrate the liner body portion 2 diagonally in the front-rear direction. The lower end of the first vent hole 6 extends to the lower end 3a of the vehicle front side part 3, and the upper end of the first vent hole 6 extends to a position higher than a center C of the front tire 32.

As illustrated in FIGS. 1 and 2, a second vent hole 7 penetrating the vehicle rear side end portion of the lower wall portion 5 in the upper-lower direction is formed in the vehicle rear side end portion of the lower wall portion 5. More precisely, the second vent hole 7 is provided with a plurality of fins 7a guiding air and inclined downwards toward the vehicle rear side, and thus the second vent hole 7 is formed to penetrate the lower wall portion 5 diagonally in the upper-lower direction. The rear end of the second vent hole 7 extends to the lower end 3a of the vehicle front side part 3. As illustrated in FIG. 3, the first vent hole 6 and the second vent hole 7 are continuously formed as if the first vent hole 6 and the second vent hole 7 are formed across the lower wall portion 5 and the vehicle front side part 3 of the liner body portion 2.

Air spats 8 are provided, as a negative pressure generation part generating a negative pressure under the second vent hole 7, on the vehicle front side of the second vent hole 7 beneath the lower surface of the lower wall portion 5. The air spats 8 separate downwards a traveling wind RW flowing through the lower side of the lower wall portion 5. The air spats 8 have a rectangular plate-shaped attachment plate 9 attached to the lower surface of the lower wall portion 5 on the front side of the second vent hole 7 and a rectangular plate-shaped wind receiving plate 10 extending downwards the rear end portion of the attachment plate 9. As illustrated in FIG. 2, the air spats 8 are formed substantially in an inverted L-shape when viewed in the vehicle width direction of the vehicle. In the fender liner 1 according to the first embodiment, the air spats 8 are disposed as described above. Accordingly, by the traveling wind RW that flows through the lower side of the lower wall portion 5 hitting the wind receiving plate 10 and being separated downwards as illustrated in FIG. 2, the negative pressure is generated behind the wind receiving plate 10, that is, under the second vent hole 7 (refer to the X portion in FIG. 2).

The sub radiator 40 is mounted in the vehicle separately from a main radiator (not illustrated) for engine cooling. In a conventional vehicle, for example, the sub radiator 40 is mounted for cooling of a coolant lower in temperature than an engine coolant. In a hybrid vehicle, for example, the sub radiator 40 is mounted for cooling of electronic equipment such as an inverter. In the first embodiment, the sub radiator 40 is disposed in front of the fender liner 1 to face the first vent hole 6.

An air intake port 35 taking in cooling air for the sub radiator 40 is formed on the vehicle front side of the sub radiator 40 in a front bumper (vehicle front portion) 33. An inlet duct 36 is provided on the front side of the sub radiator 40, and the inlet duct 36 guides, to the sub radiator 40, air introduced from the air intake port 35. An outlet duct 37 is provided on the vehicle rear side of the sub radiator 40, and the outlet duct 37 guides, to the first vent hole 6 and the second vent hole 7, the air after passage through the sub radiator 40.

As a result of the configuration, in the first embodiment, a coolant is cooled in the sub radiator 40 by heat exchange with the air taken in from the air intake port 35 and flowing through the inlet duct 36 and the air flowing through the outlet duct 37 after passage through the sub radiator 40 is discharged from the first vent hole 6 and the second vent hole 7.

Figure 20:
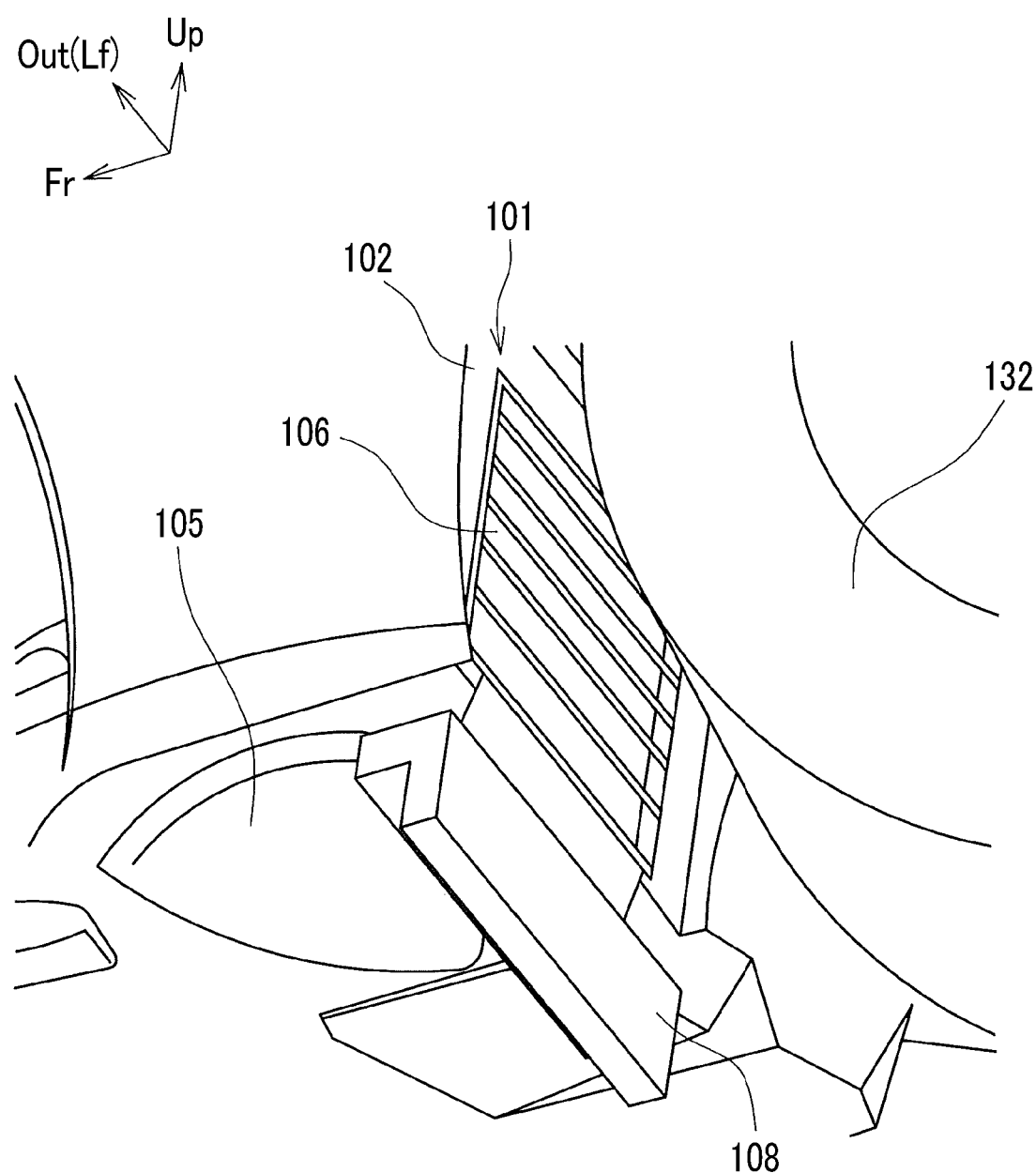
FIG. 20 is a perspective view in which a liner body portion and a lower wall portion of the fender liner according to the related art are viewed diagonally from behind and from below.

FIG. 20 is a perspective view in which a liner body portion 102 and a lower wall portion 105 of a fender liner 101 according to the related art are viewed diagonally from behind and from below. As is apparent from comparison between FIG. 3 and FIG. 20, the fender liner 101 and the fender liner 1 differ in configuration from each other in that a vent hole 106 is formed solely in the liner body portion 102 in the fender liner 101 according to the related art whereas the second vent hole 7 is formed also in the lower wall portion 5 in the fender liner 1 according to the first embodiment, and in that the air spats 8 are disposed on the vehicle front side of the second vent hole 7 in the lower wall portion 5 in the fender liner 1 according to the first embodiment although air spats 108 are disposed in the lower wall portion 105 also in the fender liner 101 according to the related art. The differences in configuration result in the following significant difference in action and effect.

Action and Effect

The action and effect of the fender liner structure according to the first embodiment will be described below based on comparison to the fender liner structure provided with the fender liner 101 according to the related art that is illustrated in FIG. 20. FIGS. 4 to 7B, 21, and 22 schematically illustrate computer aided engineering (CAE) analysis results. The arrows in FIGS. 4, 5, 7A, 7B, 21, and 22 schematically indicate air flows.

In the fender liner structure according to the first embodiment, part of the air that has passed through the sub radiator 40 flows into the wheel house 31 through the first vent hole 6 formed at the vehicle front side part 3 of the liner body portion 2. This is common to the fender liner structures according to the first embodiment and the related art.

Figure 4:
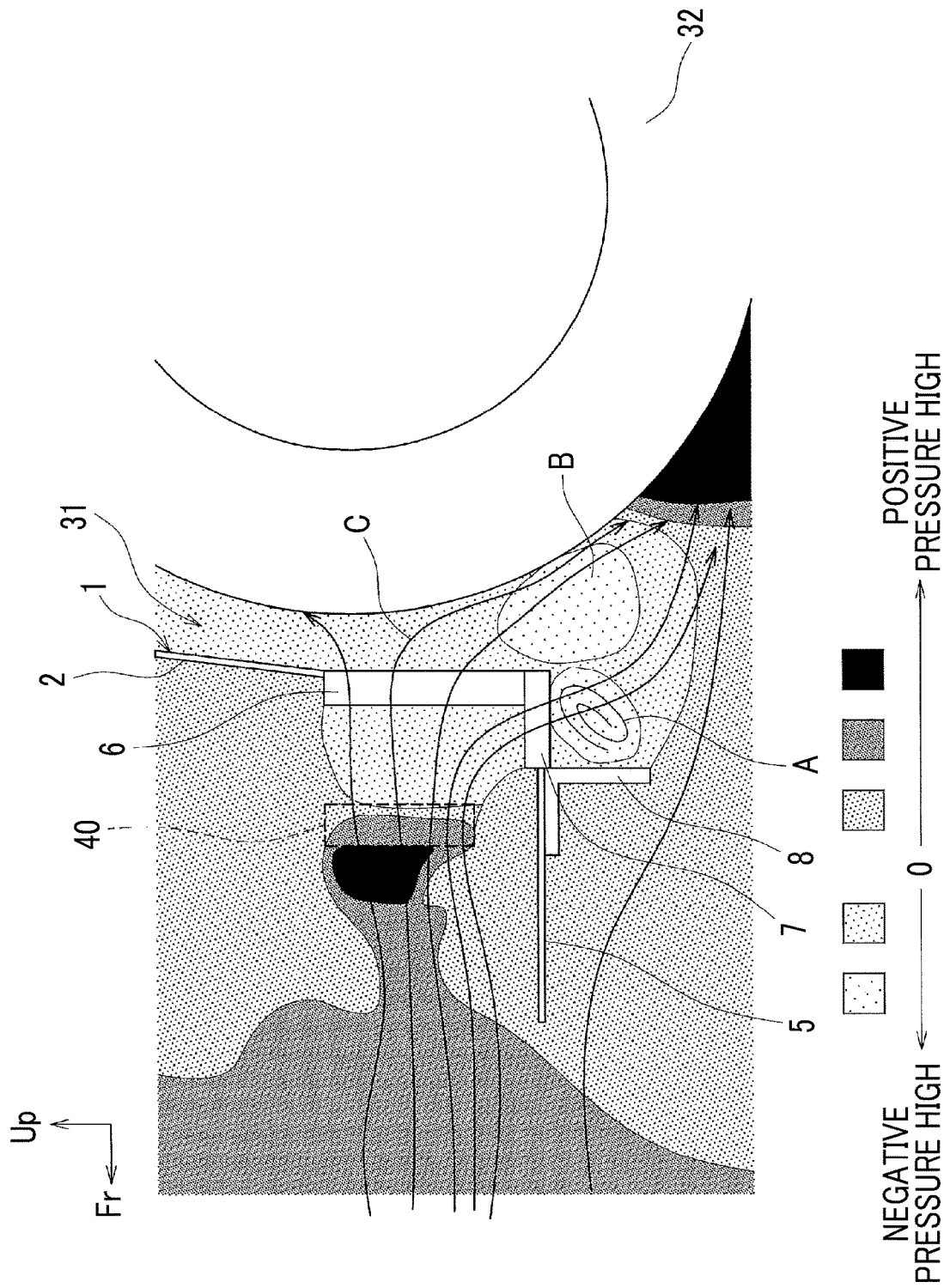
FIG. 4 is a diagram schematically illustrating the pressure distribution around the fender liner.
Figure 21:
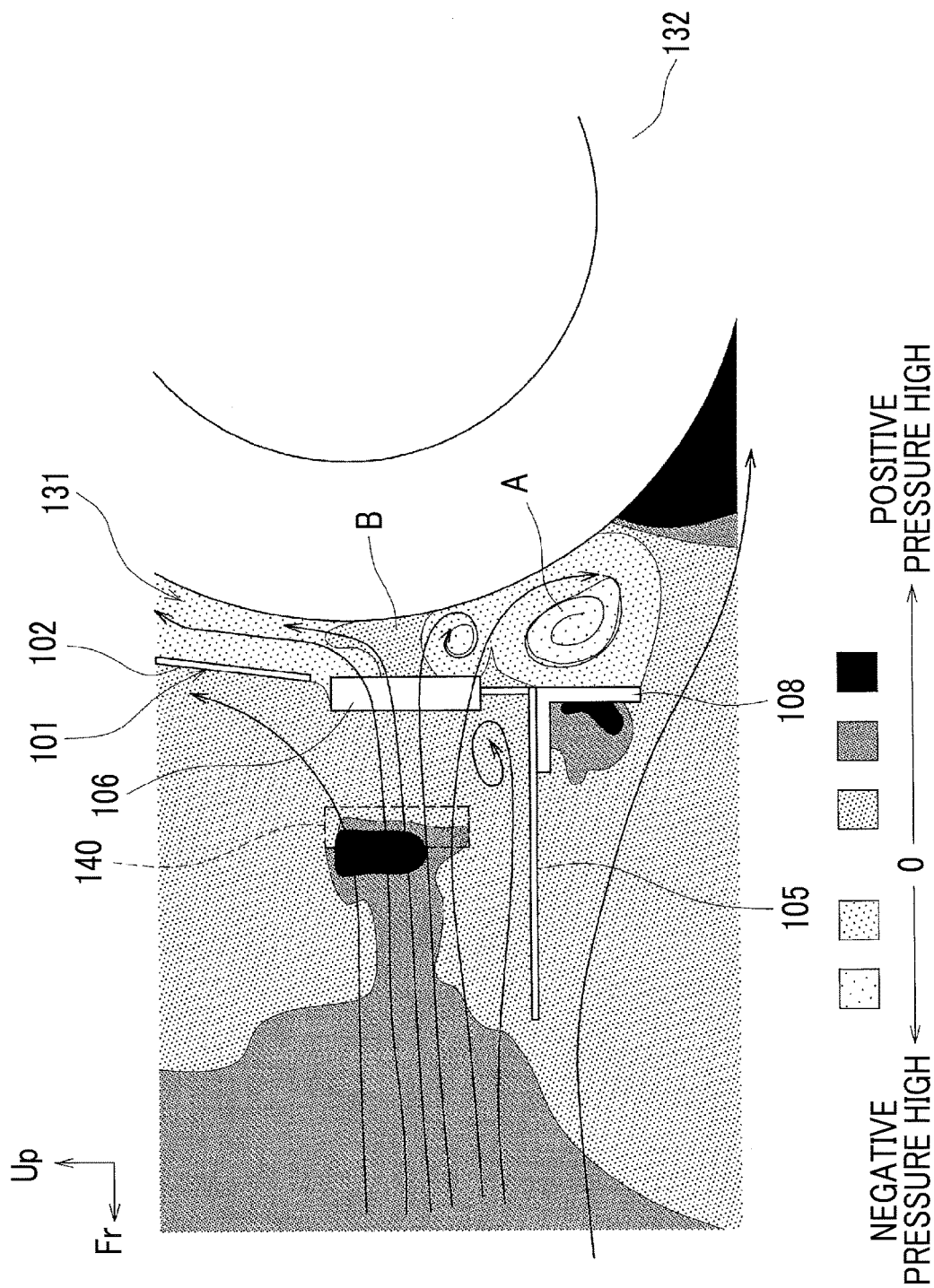
FIG. 21 is a diagram schematically illustrating the pressure distribution around the fender liner according to the related art.

FIG. 4 is a diagram schematically illustrating the pressure distribution around the fender liner 1. FIG. 21 is a diagram schematically illustrating the pressure distribution around the fender liner 101 according to the related art. In FIGS. 4 and 21, hatching is applied so that the denser dots indicate a higher positive pressure (and the black represents the region that has the highest positive pressure) and the coarser dots indicate a higher negative pressure. In the fender liner structure according to the first embodiment, the second vent hole 7 penetrating the vehicle rear side end portion in the upper-lower direction is formed in the lower wall portion 5 and the air spats 8 are disposed on the vehicle front side of the second vent hole 7 beneath the lower surface of the lower wall portion 5. Accordingly, the negative pressure is generated behind the air spats 8, that is, under the second vent hole 7 as illustrated in the A portion in FIG. 4. Also in the fender liner structure according to the related art, a negative pressure is generated behind the air spats 108 as illustrated in the A portion in FIG. 21.

Figure 5:
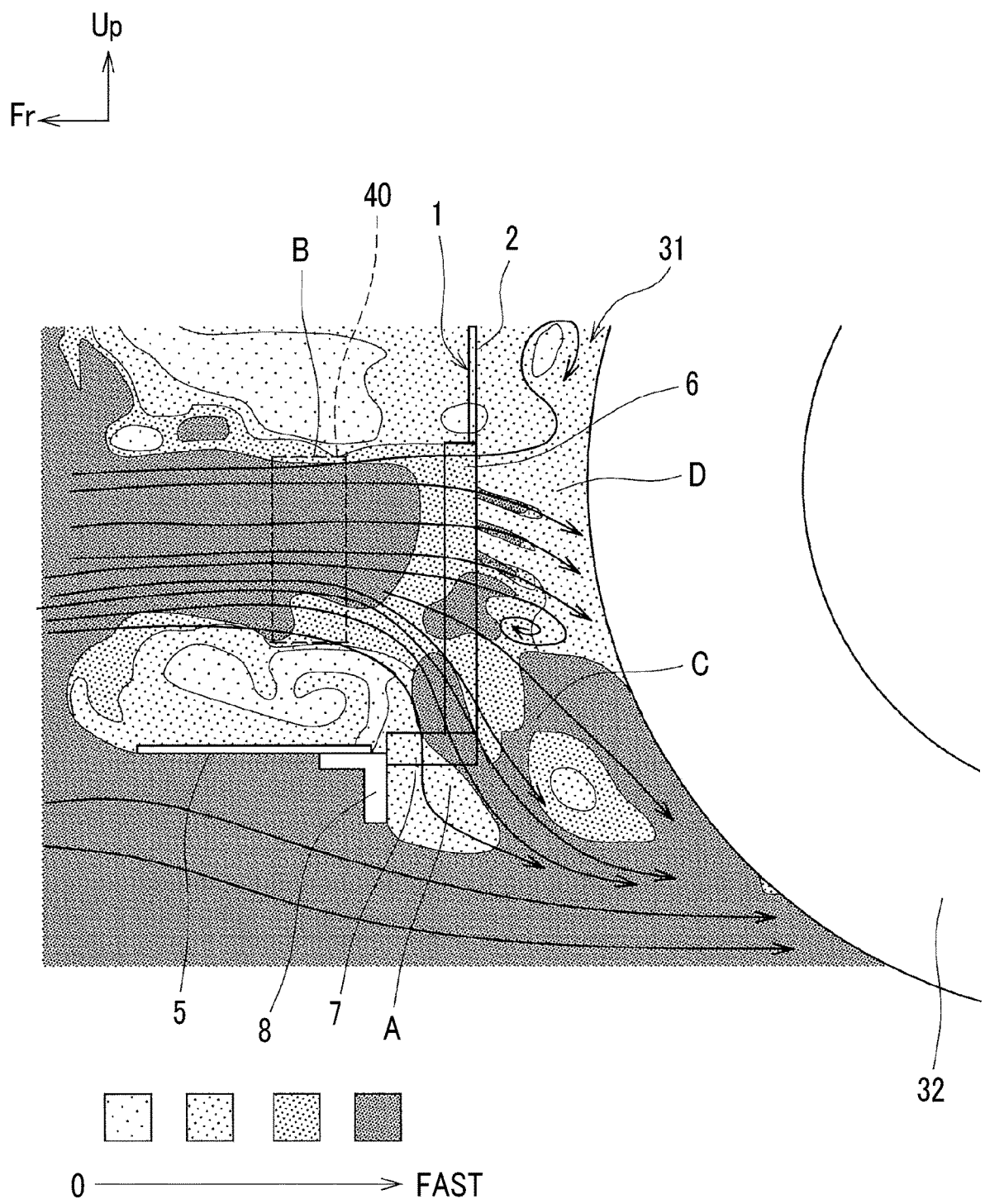
FIG. 5 is a diagram schematically illustrating the flow velocity distribution around the fender liner.
Figure 22:
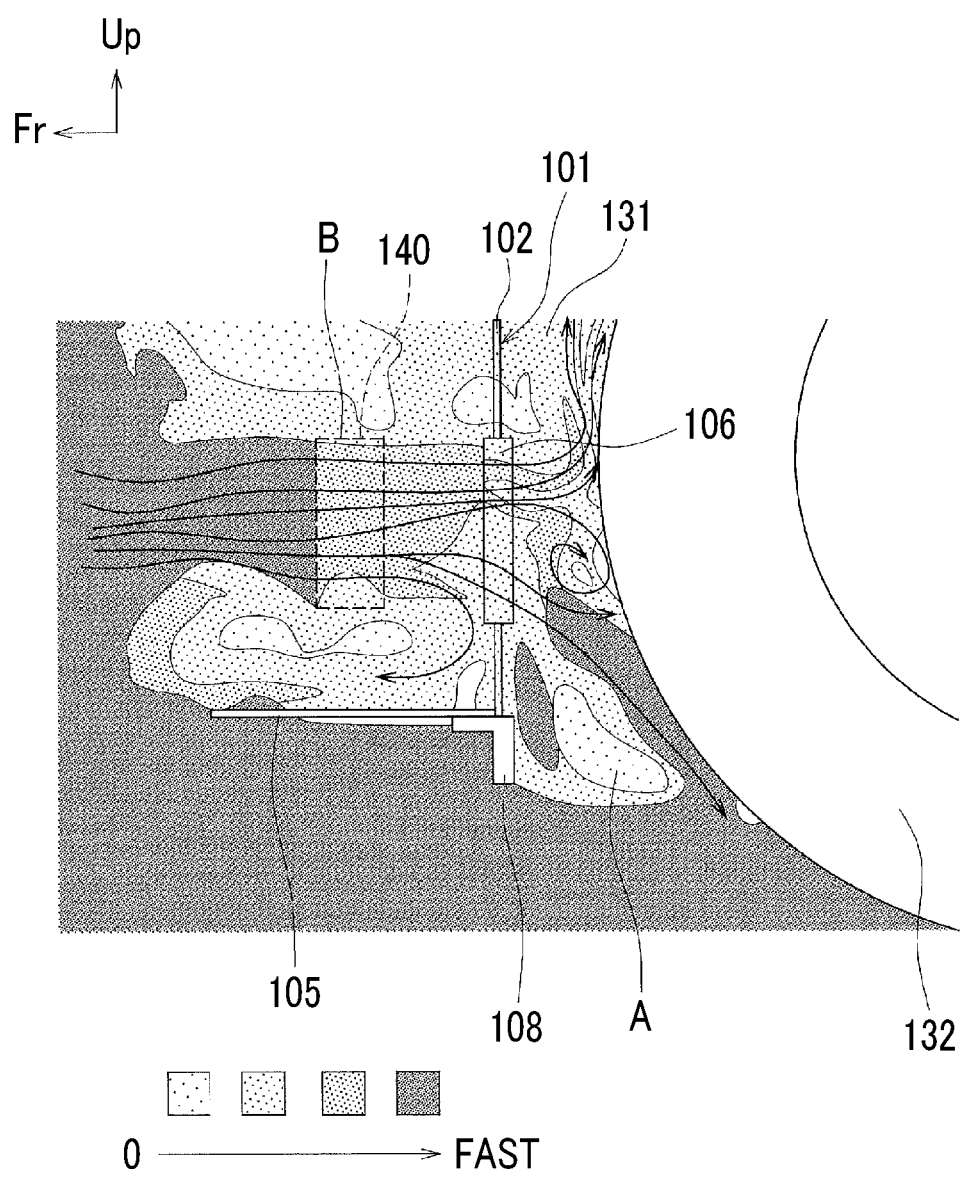
FIG. 22 is a diagram schematically illustrating the flow velocity distribution around the fender liner according to the related art.

FIG. 5 is a diagram schematically illustrating the flow velocity distribution around the fender liner 1. FIG. 22 is a diagram schematically illustrating the flow velocity distribution around the fender liner 101 according to the related art. In FIGS. 5 and 22, hatching is applied so that the denser dots indicate a higher flow velocity. In the fender liner structure according to the first embodiment, a negative pressure is generated under the second vent hole 7. Accordingly, as illustrated in the A portion in FIG. 5, another part of the air that has passed through the sub radiator 40 is pulled downwards and passes through the second vent hole 7 downwards at a relatively high flow velocity. In other words, in the fender liner structure, air discharge from the second vent hole 7 is promoted by the action of the negative pressure generated under the second vent hole 7 as compared with, for example, a case where simply a vent hole is formed in the lower wall portion 5. As a result, the fender liner structure according to the first embodiment is capable of obtaining a discharge effect beyond simple discharge area expansion, that is, discharge area expansion from the area of the first vent hole 6 to the combined area of the first vent hole 6 and the second vent hole 7, the flow velocity of the air passing through the sub radiator 40 becomes relatively high as illustrated in the B portion in FIG. 5 (refer to the B portions in FIGS. 5 and 22), and the amount of the air that passes through the sub radiator 40 increases.

In the fender liner structure according to the related art, in contrast, part of the air that has passed through the vent hole 106 is merely pulled downwards by the negative pressure generated behind the air spats 108 as illustrated in the A portion in FIG. 22 and air discharge from the vent hole 106 is not promoted. Accordingly, in the configuration of the fender liner structure according to the related art, the flow velocity of the air that passes through a sub radiator 140 does not increase, as illustrated in the B portion in FIG. 22, and the amount of the air passing through the sub radiator 140 does not increase.

FIGS. 6A and 6B are diagrams schematically illustrating the $C_X$ value distribution in the front tire 32. FIG. 6A relates to the fender liner structure according to the first embodiment. FIG. 6B relates to the fender liner structure according to the related art. The $C_X$ value is a value indicating the level of the pressure applied to each of minute parts in a case where a projection plane on the front side of the front tire 32 is divided into the minute parts and the sum of the Cx values as described above is the Cd value (air resistance coefficient) of the front tire 32. In FIGS. 6A and 6B, hatching is applied so that the denser dots indicate a larger Cx value (higher pressure).

As described above, in the fender liner structure according to the first embodiment, the first vent hole 6 and the second vent hole 7 are continuously formed as if the first vent hole 6 and the second vent hole 7 are formed across the lower wall portion 5 and the vehicle front side part 3 of the liner body portion 2. Accordingly, most of the air that has passed through the first vent hole 6 flows downwards, drawn by the fast downward flow from the second vent hole 7, as illustrated in the C portion in FIG. 5. As a result, the amount of the air flowing through the lower side of the front tire 32 increases. When most of the air that should flow to the front side of the front tire 32 through the first vent hole 6 flows to the lower side of the front tire 32 as described above, the amount of air on the front side of the front tire 32 in the wheel house 31 decreases. As a result, the pressure on the front side of the front tire 32 decreases as illustrated in the B portion in FIG. 4. As is apparent from comparison between FIGS. 6A and 6B, in the fender liner structure according to the first embodiment, the Cd value of the front tire 32 can be significantly reduced as compared with the fender liner structure according to the related art, in which no decline in pressure occurs on the front side of the front tire 132. In this manner, in the fender liner structure according to the first embodiment, the air resistance that is applied to the front tire 32 decreases, and thus aerodynamic performance improvement can be achieved.

Figure 7A:
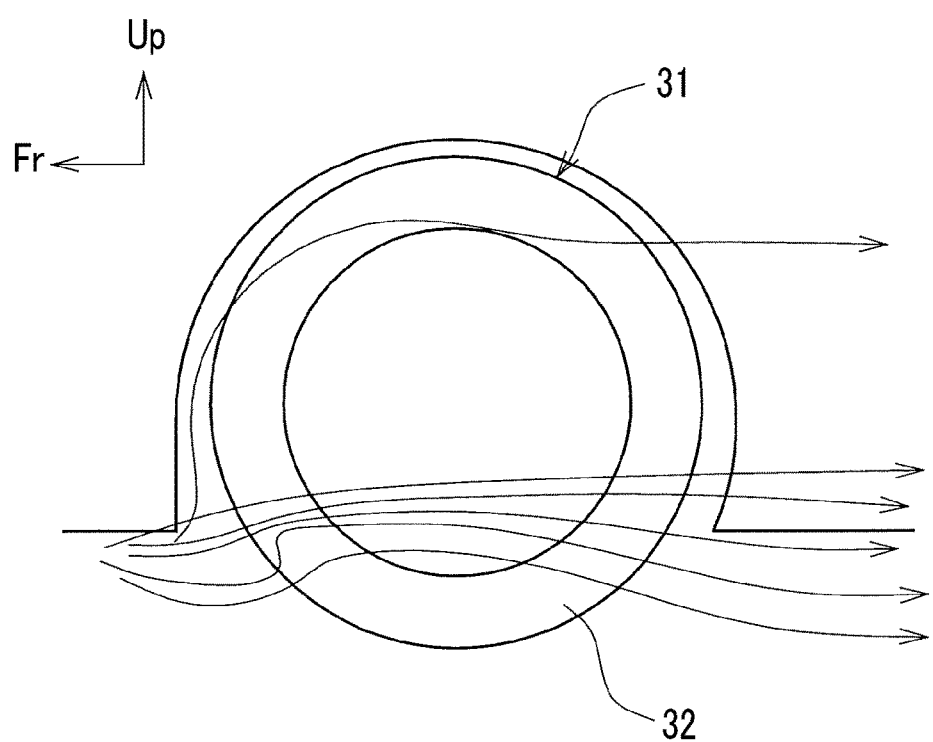
FIG. 7A is a diagram schematically illustrating air stream lines around the front tire and relates to the fender liner structure according to the first embodiment.
Figure 7B:
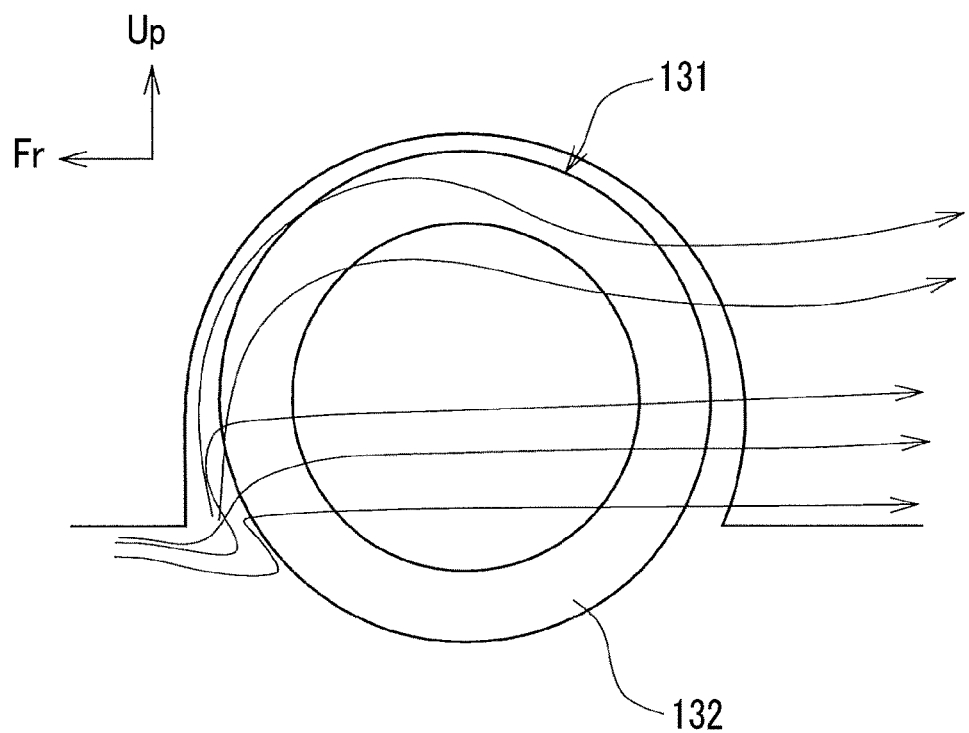
FIG. 7B is a diagram schematically illustrating air stream lines around the front tire and relates to the fender liner structure according to the related art.

FIGS. 7A and 7B are diagrams schematically illustrating air stream lines around the front tire 32. FIG. 7A relates to the fender liner structure according to the first embodiment. FIG. 7B relates to the fender liner structure according to the related art. As described above, in the fender liner structure according to the first embodiment, the amount of air flowing through the lower side of the front tire 32 increases. Accordingly, the amount of air inflow into the wheel house 31 can be significantly decreased as compared with the related art as is apparent from comparison between FIGS. 7A and 7B. Accordingly, as is apparent from comparison between the C portion in FIG. 4 and the B portion in FIG. 21, in the fender liner structure according to the first embodiment, the pressure in the wheel house 31 significantly decreases as compared with the fender liner structure according to the related art, and thus further aerodynamic performance improvement can be expected.

By the pressure in the wheel house 31 decreasing, the pressures in front of and behind the vehicle front side part 3 of the liner body portion 2 become different from each other. As illustrated in the D portion in FIG. 5, this pressure difference leads to a natural increase in the amount of discharge from the first vent hole 6 facing the wheel house 31. As a result, the discharge effect beyond discharge area expansion can be obtained to a larger extent and the amount of air passing through the sub radiator 40 can be increased.

As described above, in the fender liner structure according to the first embodiment, the air resistance applied to the front tire 32 is decreased by an increase in the discharge amount of air flowing through the lower side of the front tire 32 as well as an increase in the amount of air passing through the sub radiator 40 even without, for example, the air intake port 35 and the sub radiator 40 being made relatively large or a separate blower or the like being added. Accordingly, a high level of aerodynamic performance improvement and a high level of cooling performance for the sub radiator 40 can be achieved at the same time with design remaining intact and an increase in weight and cost suppressed.

Second Embodiment

A second embodiment differs from the first embodiment in that an air intake port 45 is relatively small. The following description will focus on the difference from the first embodiment.

As described above, the fender liner structure according to the first embodiment is capable of obtaining a discharge effect beyond simple discharge area expansion. This means a discharge amount equivalent to that of the fender liner structure according to the related art can be ensured, even when the discharge area or the like is relatively small, insofar as the configuration of the disclosure is adopted. Accordingly, a cooling performance equivalent to the cooling performance of the sub radiator 140 of the fender liner structure according to the related art can be ensured, even when, for example, the air intake port 45 is small, in a case where aerodynamic performance improvement is the main focus.

Figure 8:
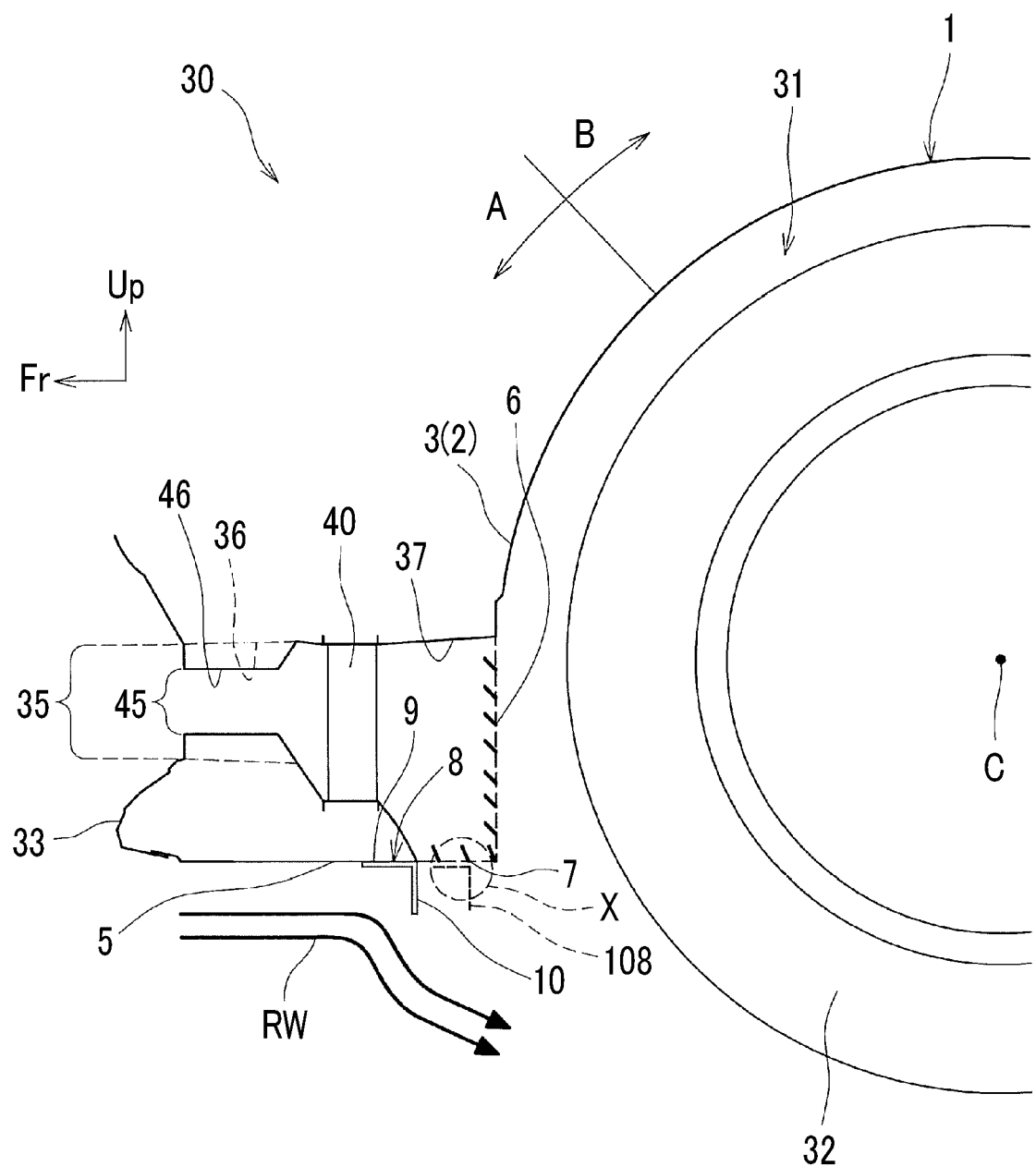
FIG. 8 is a sectional view schematically illustrating a fender liner structure according to a second embodiment of the disclosure.

FIG. 8 is a sectional view schematically illustrating the fender liner structure according to the second embodiment. As is apparent from comparison between FIGS. 8 and 2, in the second embodiment, the air intake port 45 formed in the front bumper 33 is smaller than the air intake port 35 according to the first embodiment with the configurations of the fender liner 1, the sub radiator 40, and so on remaining the same. As the air intake port 45 is made relatively small, an inlet duct 46 also is formed to be smaller in sectional area than the inlet duct 36 according to the first embodiment.

Here, the fender liner structure according to the related art and the fender liner structure according to the first embodiment differ from each other solely in terms of the presence or absence of the second vent hole 7 and the attachment position of the air spats 8. Accordingly, it can be said that the air intake port 45 according to the second embodiment, which is formed in the front bumper 33, is relatively smaller than in the fender liner structure according to the related art, which lacks the second vent hole 7.

Since the air intake port 45 is relatively small as described above, the amount of air hitting the sub radiator 40 can be reduced as compared with the air intake port 35. As a result, the air resistance that is applied to the sub radiator 40 can be reduced. Therefore, according to the second embodiment, a reduction in the Cd value of the front tire 32 described above and a reduction in the air resistance applied to the sub radiator 40 are combined with each other, leading to further aerodynamic performance improvement. In addition, the design of the front bumper 33 can be enhanced by the relatively small air intake port 45.

In the second embodiment, air intake from the air intake port 45 is not easy because of the relatively small air intake port 45. Still, air discharge from the second vent hole 7 is promoted by negative pressure generation, and thus the difficulty of intake can be offset. Accordingly, the amount of air passing through the sub radiator 40 can be maintained equivalently to the air amount in the fender liner structure according to the related art. Therefore, even in a case where the air intake port 45 is relatively small, a cooling performance equivalent to the cooling performance of the sub radiator 140 of the fender liner structure according to the related art can be ensured.

As described above, according to the second embodiment, further aerodynamic performance improvement can be achieved with the cooling performance of the sub radiator 40 ensured equivalently to the related art. Accordingly, a high level of aerodynamic performance improvement and a high level of cooling performance for the sub radiator 40 can be achieved at the same time as in the case of the first embodiment.

Third Embodiment

A third embodiment differs from the first embodiment in that a first vent hole 16 is relatively small and in terms of the shape of an outlet duct 47. The following description will focus on the differences from the first embodiment.

In the second embodiment, aerodynamic performance improvement is aimed at by the air intake port 45 in front of the sub radiator 40 being formed relatively small. In the third embodiment, further aerodynamic performance improvement is aimed at by means of the relatively small first vent hole 16.

Fender Liner Structure

Figure 9:
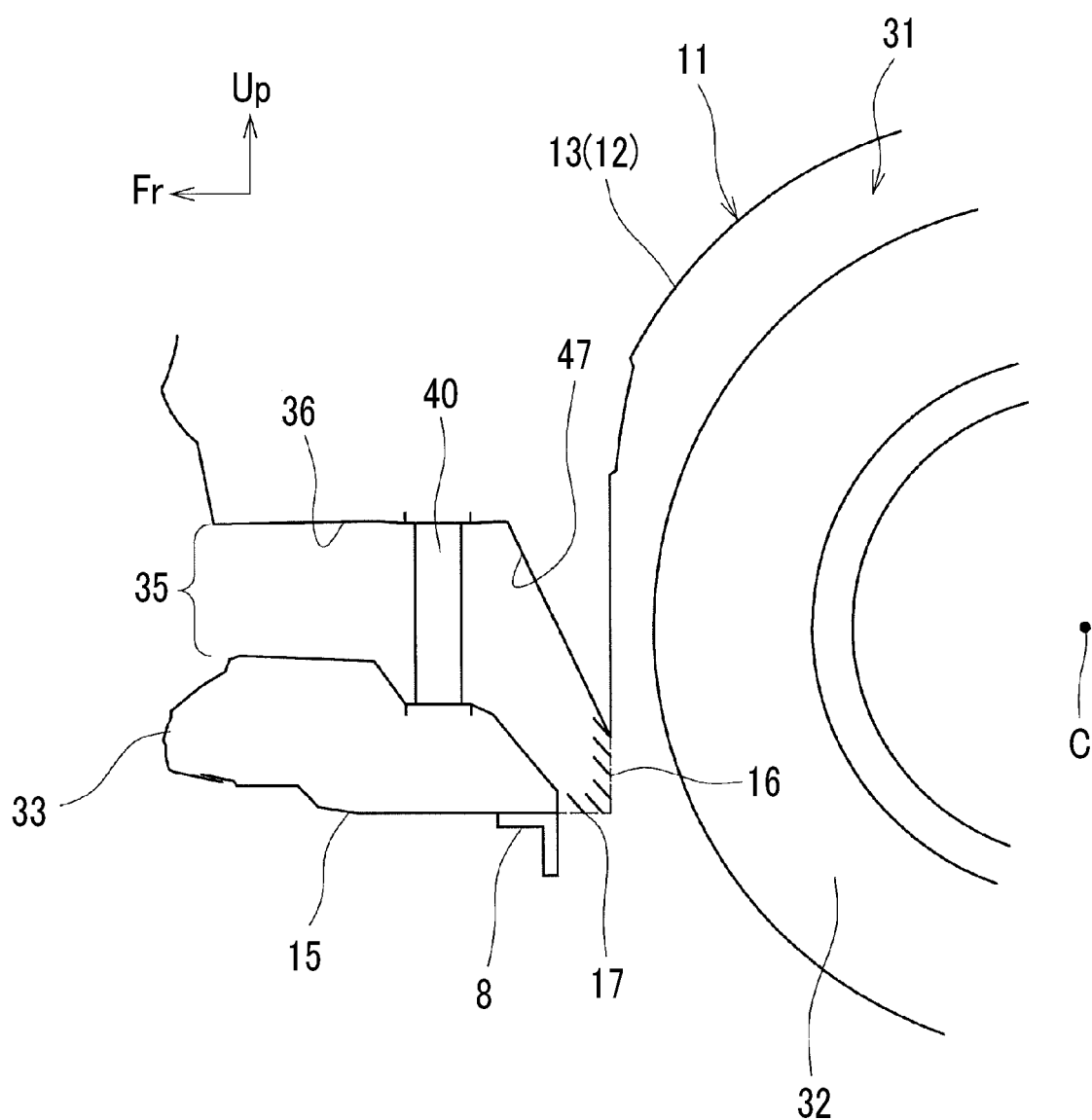
FIG. 9 is a sectional view schematically illustrating a fender liner structure according to a third embodiment of the disclosure.
Figure 10:
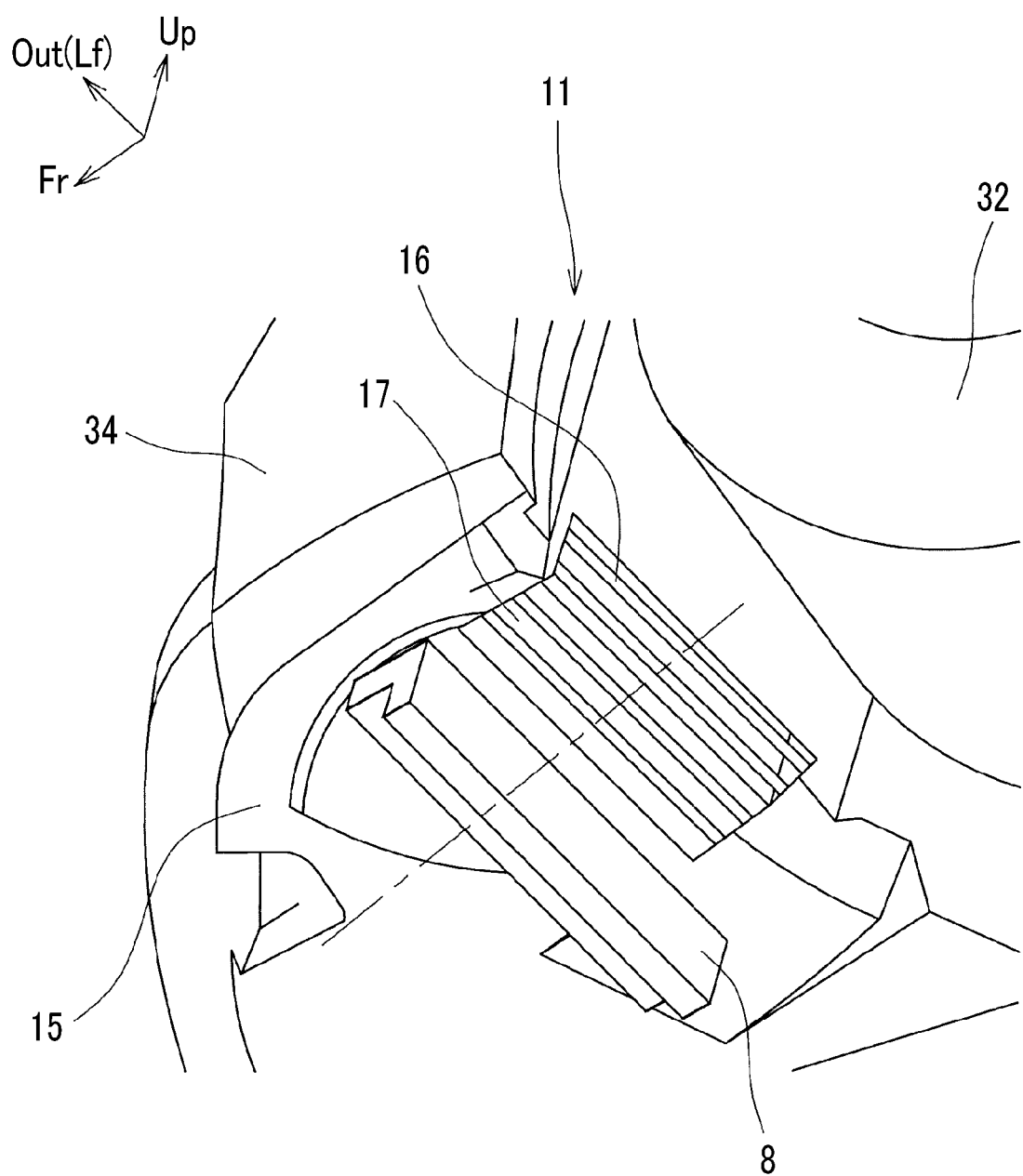
FIG. 10 is a perspective view in which the liner body portion and the lower wall portion are viewed diagonally from below.

FIG. 9 is a sectional view schematically illustrating the fender liner structure according to the third embodiment. FIG. 10 is a perspective view in which a liner body portion 12 and a lower wall portion 15 are viewed diagonally from below. In the fender liner 1 according to the first embodiment, the first vent hole 6 penetrating the liner body portion 2 diagonally in the front-rear direction is formed at the vehicle front side part 3 of the liner body portion 2 such that the lower end of the fender liner 1 extends to the lower end 3a of the vehicle front side part 3 and the upper end of the fender liner 1 extends to a position higher than the center C of the front tire 32. In a fender liner 11 according to the third embodiment, in contrast, the first vent hole 16 is formed in the lower end portion of a vehicle front side part 13 of the liner body portion 12 such that the lower end of the fender liner 11 extends to the lower end of the vehicle front side part 13 of the liner body portion 12 and the upper end of the fender liner 11 is positioned lower than the center C of the front tire 32. As a result, the height dimension of the first vent hole 16 is smaller than the height dimension of the first vent hole 6.

The lower wall portion 15, a second vent hole 17, and the air spats 8 of the fender liner 11 are similar to the lower wall portion 5, the second vent hole 7, and the air spats 8 of the fender liner 1. As illustrated in FIG. 10, the fender liner 11 is similar to the fender liner 1 also in that the first vent hole 16 and the second vent hole 17 are continuously formed as if the first vent hole 16 and the second vent hole 17 are formed across the lower wall portion 15 and the vehicle front side part 13 of the liner body portion 12.

The outlet duct 47, which guides air to the first vent hole 16 and the second vent hole 17 after passage through the sub radiator 40, is formed to have an upper portion inclined downwards toward the vehicle rear side as the relatively small first vent hole 16 is formed in the lower end portion of the vehicle front side part 13 of the liner body portion 12.

Action and Effect

FIG. 11 is a diagram schematically illustrating the flow velocity distribution around the fender liner 11. FIG. 12 is a diagram schematically illustrating the $C_X$ value distribution in the front tire 32. FIGS. 11 and 12 schematically illustrate CAE analysis results. The arrows in FIG. 11 schematically indicate air flows.

In the fender liner structure according to the third embodiment, the relatively small first vent hole 16 is formed in the lower end portion of the vehicle front side part 13 of the liner body portion 12, and thus the amount of air flowing into the wheel house 31 can be reduced. More specifically, the first vent hole 16 is formed at a position lower than the center C of the front tire 32, and thus the air that is guided by the outlet duct 47 is unlikely to flow into the wheel house 31 in the first place. The first vent hole 16 and the second vent hole 17 are continuously formed as if the first vent hole 16 and the second vent hole 17 are formed across the lower wall portion 15 and the vehicle front side part 13 of the liner body portion 12. Accordingly, most of the air that has passed through the first vent hole 16 flows downwards, drawn by the fast downward flow from the second vent hole 17, as illustrated in FIG. 11. By these being combined, the air amount on the front side of the front tire 32 further decreases. As a result, the Cx value of the front tire 32 can be reduced more than in the first embodiment (refer to FIG. 6A) as illustrated in FIG. 12. Therefore, further aerodynamic performance improvement can be achieved.

In the fender liner structure according to the third embodiment, the amount of discharge from the first vent hole 16 itself decreases as compared with the fender liner structure according to the related art, in which the upper end of the vent hole 106 extends to a position higher than the center C of the front tire 32. Still, the decrement can be offset by the amount of discharge from the second vent hole 17, and thus the amount of air passing through the sub radiator 40 can be maintained at the air amount that is equivalent to the related art. As a result, the cooling performance of the sub radiator 40 can be ensured even in a case where the first vent hole 16 is relatively small.

As described above, according to the third embodiment, further aerodynamic performance improvement can be achieved with a cooling performance equivalent to the related art ensured. Accordingly, a high level of aerodynamic performance improvement and a high level of cooling performance for the sub radiator 40 can be achieved at the same time as in the case of the first and second embodiments.

Fourth Embodiment

A fourth embodiment differs from the third embodiment in that a slit 50 is formed in a fender liner 21 and in terms of the shape of the outlet duct 37. The following description will focus on the differences from the third embodiment.

Fender Liner Structure

Figure 13:
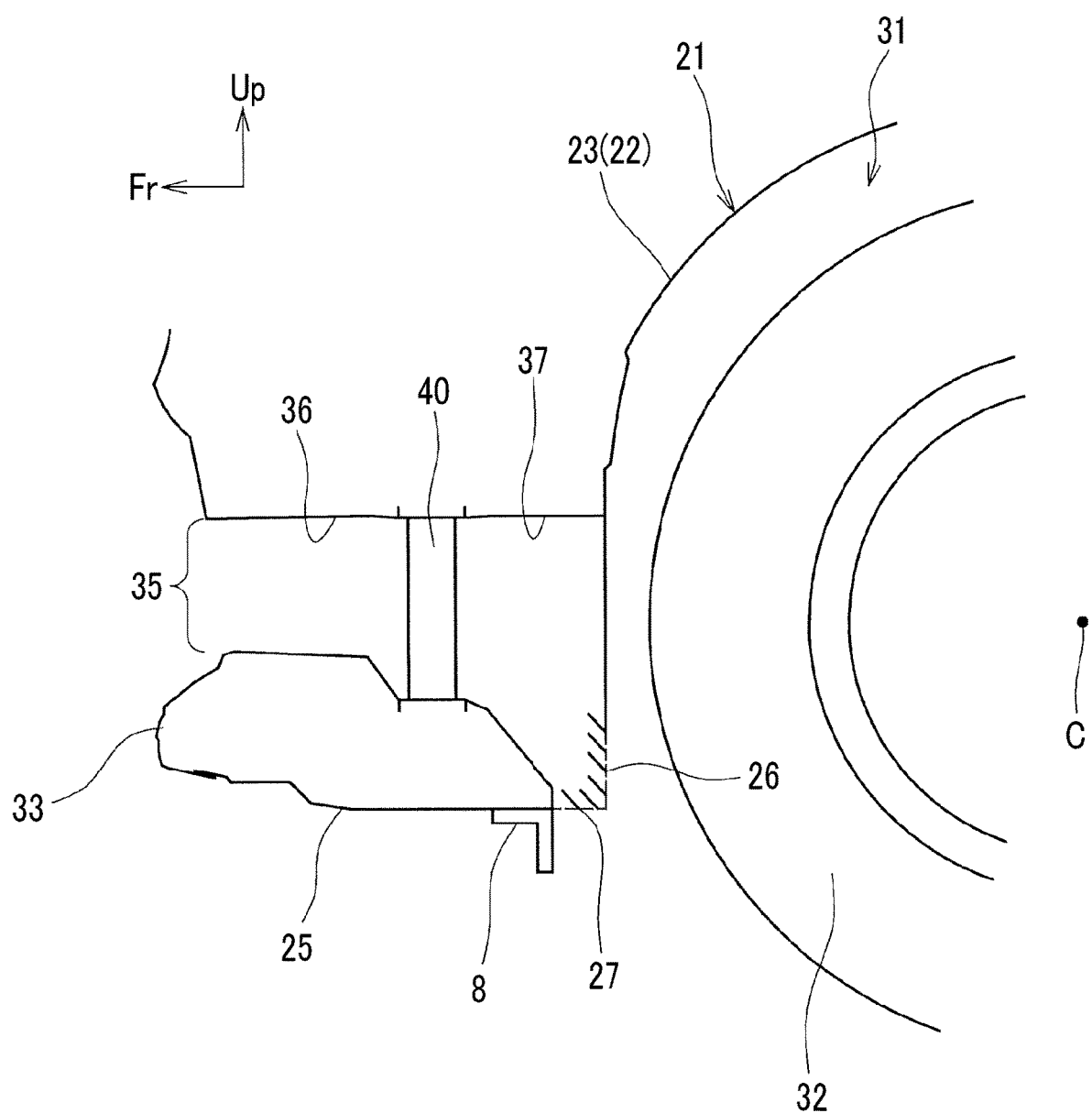
FIG. 13 is a sectional view schematically illustrating a fender liner structure according to a fourth embodiment of the disclosure.
Figure 14:
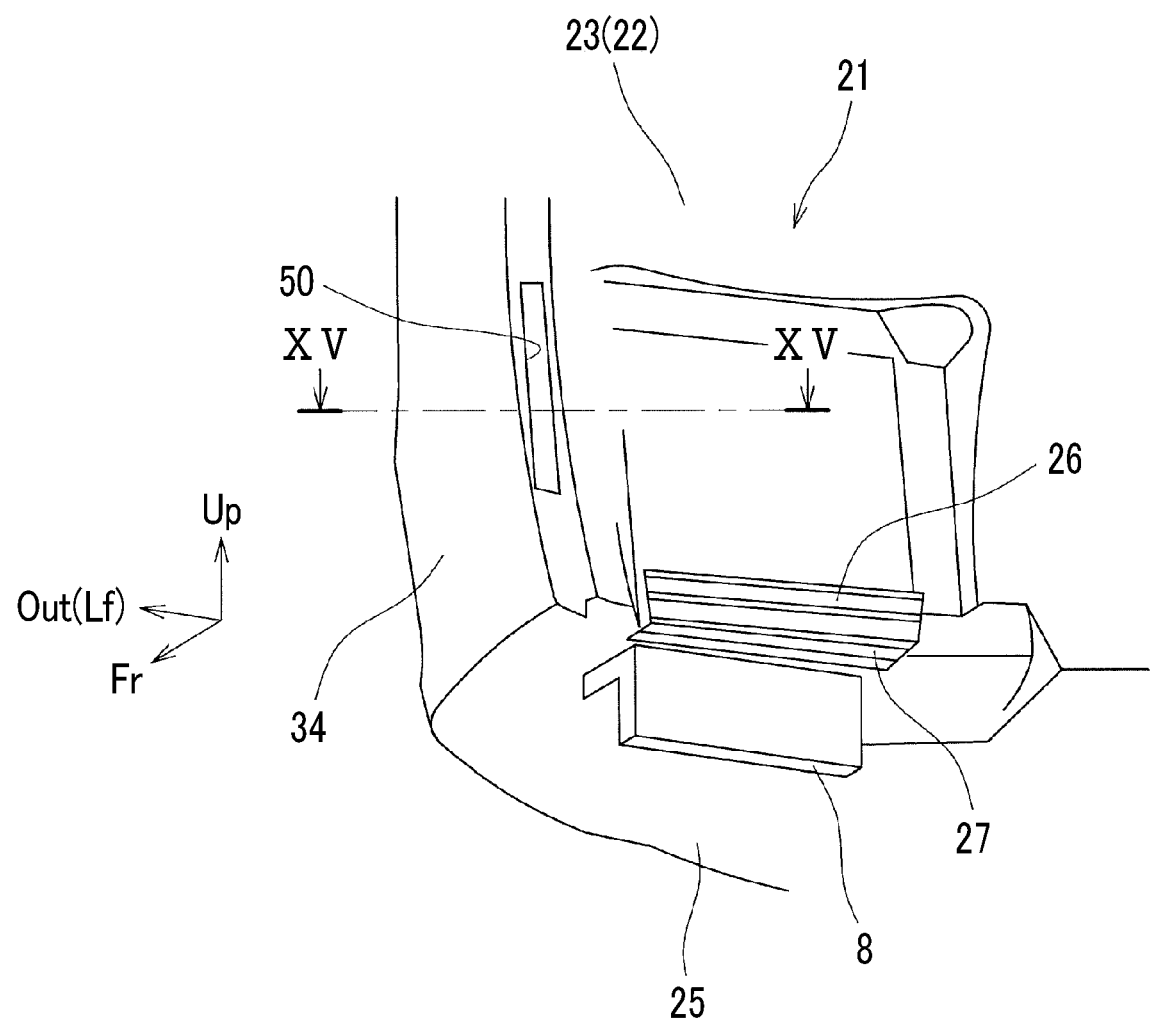
FIG. 14 is a perspective view in which the liner body portion and the lower wall portion are viewed diagonally from behind and from below.

FIG. 13 is a sectional view schematically illustrating the fender liner structure according to the fourth embodiment. FIG. 14 is a perspective view in which a liner body portion 22 and a lower wall portion 25 are viewed diagonally from behind and from below. As in the case of the third embodiment, in the fender liner 21 according to the fourth embodiment, a first vent hole 26 is formed in the lower end portion of a vehicle front side part 23 of the liner body portion 22 such that the lower end of the fender liner 21 extends to the lower end of the vehicle front side part 23 of the liner body portion 22 and the upper end of the fender liner 21 is positioned lower than the center C of the front tire 32. The lower wall portion 25, a second vent hole 27, and the air spats 8 are similar to the lower wall portion 15, the second vent hole 17, and the air spats 8 of the fender liner 11. As illustrated in FIG. 14, the fender liner 21 is similar to the fender liner 11 also in that the first vent hole 26 and the second vent hole 27 are continuously formed as if the first vent hole 26 and the second vent hole 27 are formed across the lower wall portion 25 and the vehicle front side part 23 of the liner body portion 22.

The fourth embodiment differs from the third embodiment and is identical to the first embodiment in that the upper portion of the outlet duct 37 extends rearwards at substantially the same height as the upper end of the sub radiator 40 without being inclined downwards toward the vehicle rear side.

As illustrated in FIG. 14, in the fender liner structure according to the fourth embodiment, the rectangular slit (third vent hole) 50 is formed in the end portion of the vehicle front side part 23 of the liner body portion 22 on the vehicle width direction outer side of the vehicle and at a position higher than the first vent hole 26. The slit 50 extends in the upper-lower direction through the liner body portion 22. The outlet duct 37 is formed to expand rearwards on the vehicle width direction outer side (left side) of the vehicle (refer to FIG. 15). After passage through the sub radiator 40, air is guided to the slit 50 as well as the first vent hole 26 and the second vent hole 27 via the outlet duct 37.

Action and Effect

Figure 15:
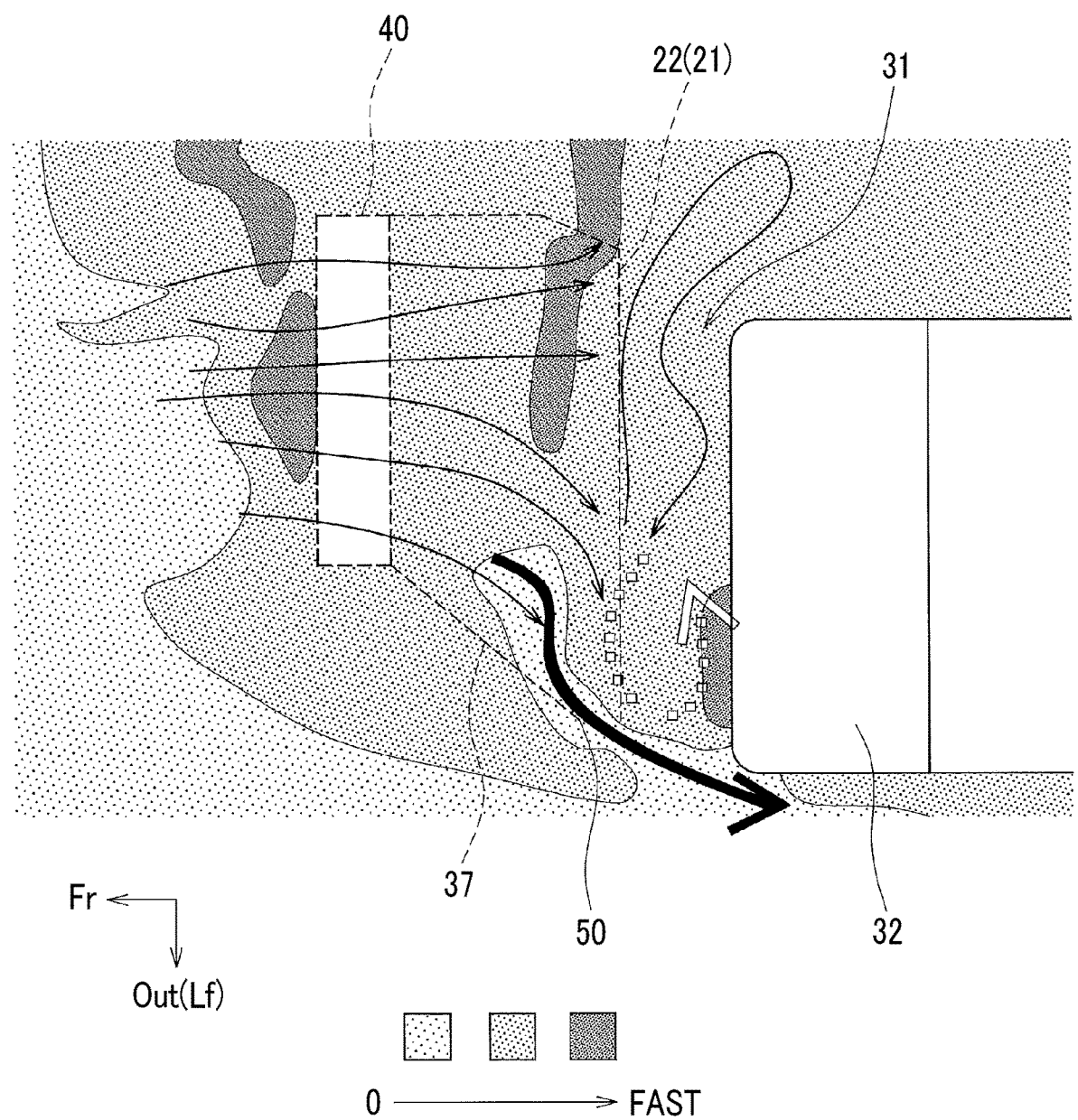
FIG. 15 is a diagram schematically illustrating the flow velocity distribution around a fender liner and corresponds to the XV-XV in FIG. 14.
Figure 23:
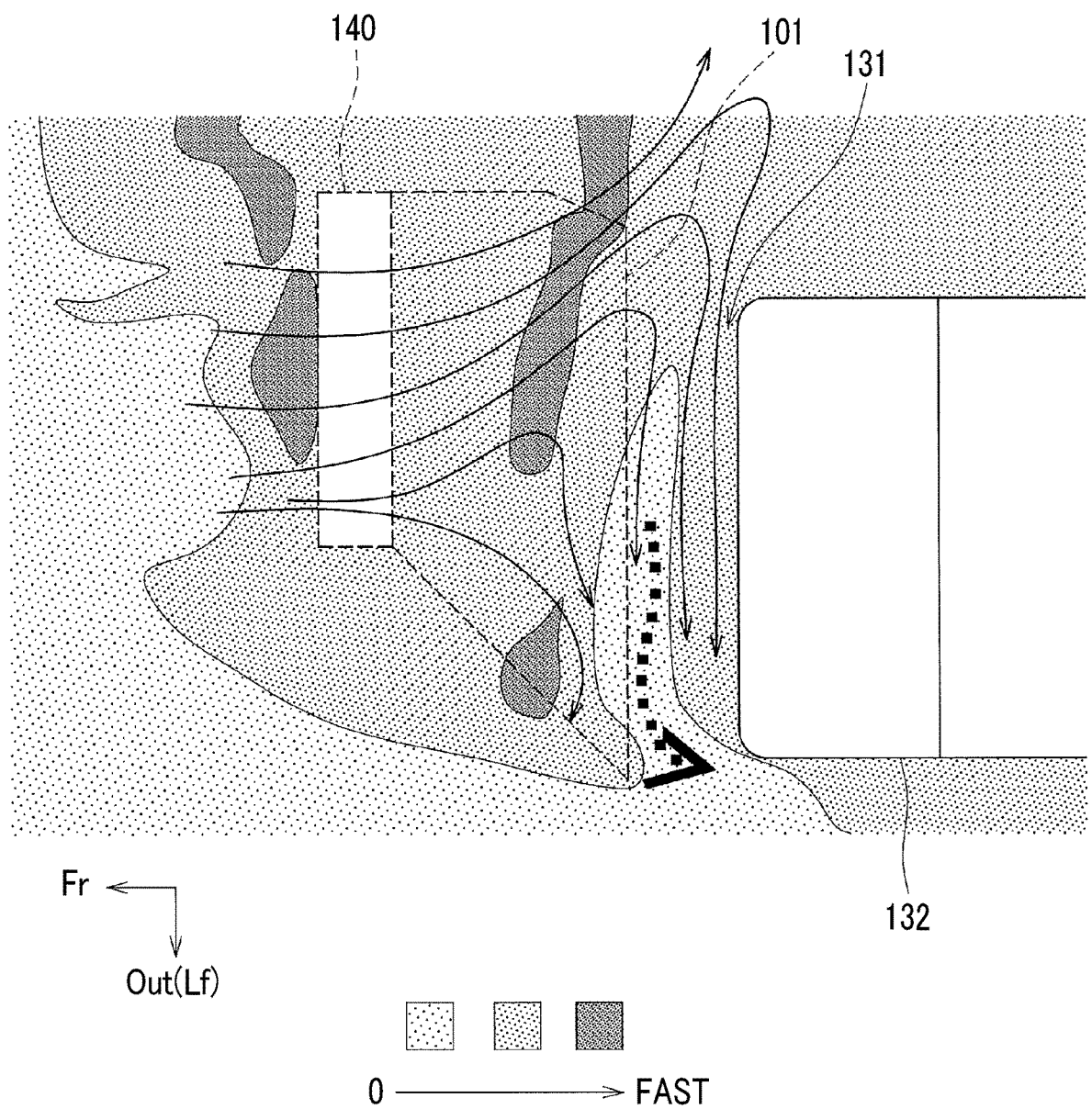
FIG. 23 is a diagram schematically illustrating the flow velocity distribution around the fender liner according to the related art and corresponds to FIG. 15.

FIG. 15 is a diagram schematically illustrating the flow velocity distribution around the fender liner 21 and corresponds to the XV-XV line in FIG. 14. FIG. 23 is a diagram schematically illustrating the flow velocity distribution around the fender liner 101 according to the related art and corresponds to FIG. 15. In FIGS. 15 and 23, hatching is applied so that the denser dots indicate a higher pressure. The arrows in the drawings schematically indicate air flows.

In a wheel house 131 that is provided with the fender liner structure according to the related art, the flow of the air that has flowed into the wheel house 131 through the vent hole 106 is disturbed. Then, as indicated by the black arrows in FIG. 23, the air may be blown out to the vehicle width direction outer side of the vehicle from the front side of a front tire 132 (between the front tire 132 and the vehicle front side part of the fender liner 101).

In the fender liner structure according to the fourth embodiment, in contrast, the slit 50 is formed in the end portion of the vehicle front side part 23 of the liner body portion 22 on the vehicle width direction outer side of the vehicle, and thus part of the air that has passed through the sub radiator 40 can be discharged from the slit 50 before flowing into the wheel house 31 and flow rearwards along the side surface of the front tire 32 on the vehicle width direction outer side of the vehicle as indicated by the black arrow in FIG. 15. As a result, the air flow in the wheel house 31 is not disturbed and the air around the front tire 32 is rectified as indicated by the outlined arrow in FIG. 15. Accordingly, outward air blowing to the vehicle width direction outer side of the vehicle can be suppressed and the air resistance that is applied to the front tire 32 can be reduced.

FIG. 16 is a diagram schematically illustrating the sub radiator passage wind amount according to the fourth embodiment. FIG. 24 is a diagram schematically illustrating the sub radiator passage wind amount of the fender liner structure according to the related art. In FIGS. 16 and 24, hatching is applied so that the denser dots indicate a higher flow velocity of the air passing through the sub radiators 40, 140. In the fourth embodiment, the air that has passed through the sub radiator 40 smoothly flows rearwards through the slit 50 and along the side surface of the front tire 32 on the vehicle width direction outer side of the vehicle. Accordingly, it can be seen that the ratio of high-flow velocity air passing through the vehicle width direction outer side of the vehicle in the sub radiator 40 as illustrated in FIG. 16 is higher than the ratio of high-flow velocity air passing through the vehicle width direction outer side of the vehicle in the sub radiator 140 illustrated in FIG. 24. In other words, in the fourth embodiment, the amount of air passing through the sub radiator 40 can be increased by the slit 50 being provided, and the cooling performance of the sub radiator 40 also can be improved as a result.

Fifth Embodiment

A fifth embodiment differs from each of the above-described embodiments in that an inclined member 18 constitutes a negative pressure generation part. The following description will focus on the difference from the embodiments.

In each of the above-described embodiments, a vortex is likely to be generated behind the wind receiving plate 10, and thus the negative pressure generated under the second vent holes 7, 17, 27 can be increased. As a result, the cooling performance of the sub radiator 40 can be enhanced by air discharge from the second vent holes 7, 17, 27 being further promoted.

Figure 17:
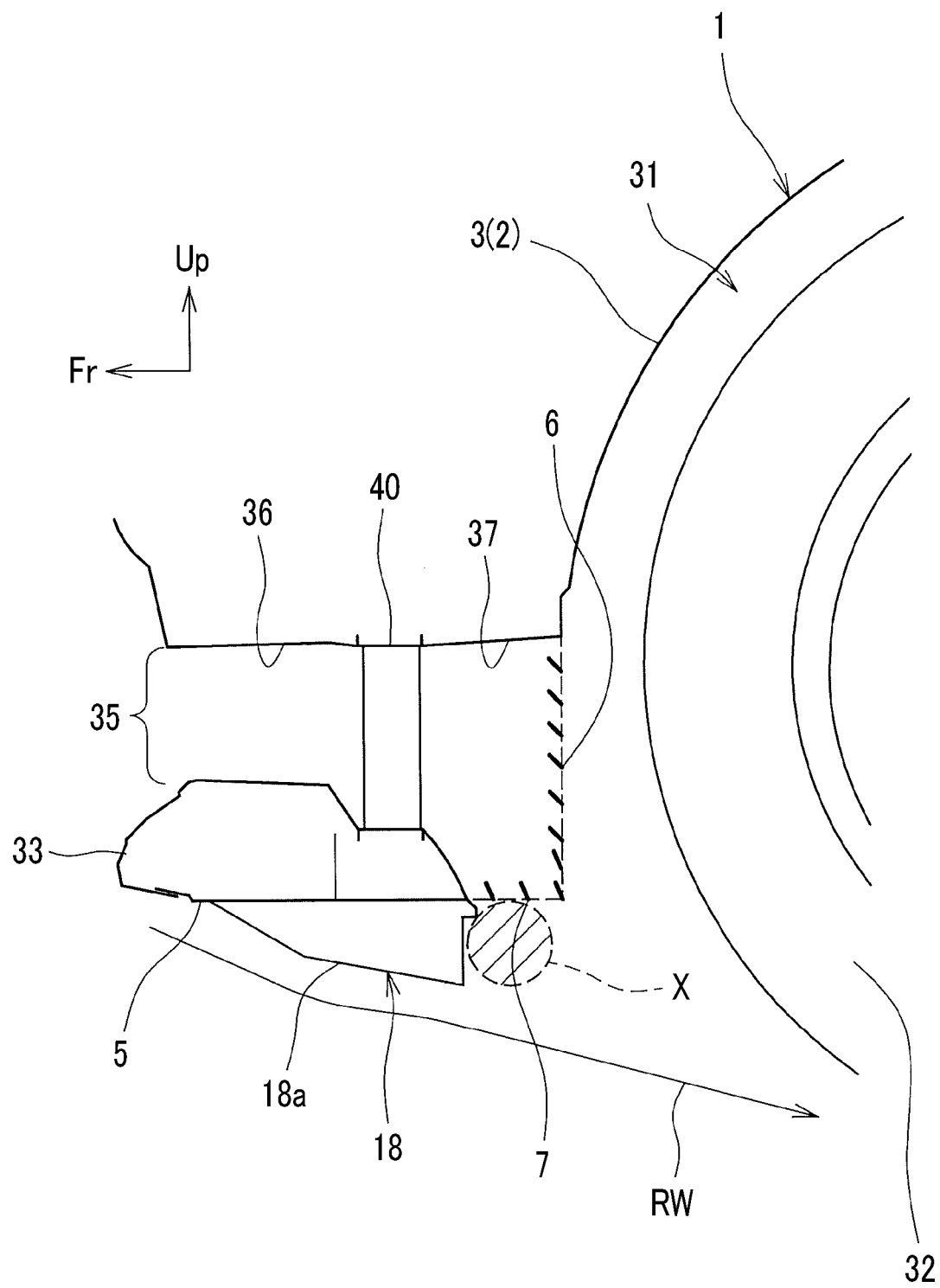
FIG. 17 is a sectional view schematically illustrating a fender liner structure according to a fifth embodiment of the disclosure.

In the fifth embodiment, in contrast, the inclined member 18 constitutes the negative pressure generation part as illustrated in FIG. 17, the inclined member 18 is attached to the vehicle front side of the second vent hole 7 beneath the lower surface of the lower wall portion 5, and the inclined member 18 has an inclined surface 18a inclined downwards from the lower surface of the lower wall portion 5 toward the vehicle rear side.

In the fifth embodiment, the traveling wind RW flowing through the lower side of the lower wall portion 5 can be smoothly flowed rearwards along the inclined surface 18a by the inclined member 18 being disposed. As a result, further aerodynamic performance improvement can be achieved. Also in this case, a vortex is generated behind the inclined member 18 (X portion in FIG. 17) on the same principle as above, and thus the cooling performance of the sub radiator 40 does not decline.

Sixth Embodiment

A sixth embodiment differs from the first and fifth embodiments in that a fin 57a of a second vent hole 57 constitutes a negative pressure generation part. The following description will focus on the difference from the first and fifth embodiments.

In the first and fifth embodiments, a separate member attached to the lower wall portion 5, such as the air spats 8 and the inclined member 18, constitutes a negative pressure generation part. However, the disclosure is not limited thereto. Alternatively, a negative pressure generation part may be disposed integrally with a fender liner 51 by, for example, a shape being devised for the lower wall portion or the like.

Figure 18:
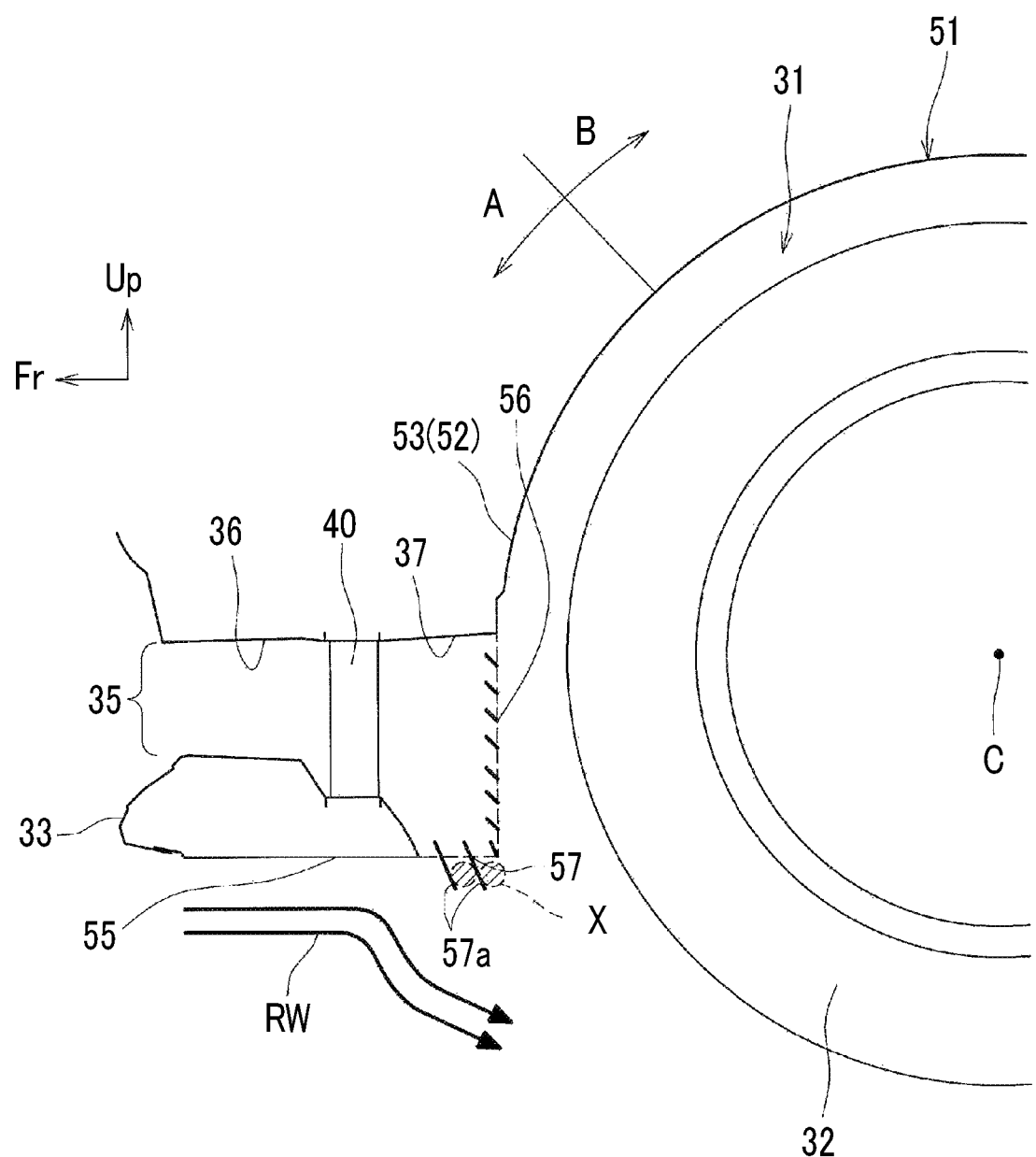
FIG. 18 is a sectional view schematically illustrating a fender liner structure according to a sixth embodiment of the disclosure.

As illustrated in FIG. 18, in the fender liner 51 according to the sixth embodiment, the negative pressure generation part generating a negative pressure under the second vent hole 57 can be configured by a plurality of the fins 57a extending below the lower surface of a lower wall portion 55. The second vent hole 57 is provided with the fins 57a guiding air and inclined downwards toward the vehicle rear side.

A liner body portion 52, a vehicle front side part 53, the lower wall portion 55, a first vent hole 56, and so on are similar in configuration to the liner body portion 2, the vehicle front side part 3, the lower wall portion 5, the first vent hole 6, and so on, and thus description thereof will be omitted.

In the sixth embodiment, a separate member such as the air spats 8 and the inclined member 18 is not used, and thus the number of parts can be reduced. As a result, an increase in weight and cost can be suppressed. As illustrated in the X portion in FIG. 18, a negative pressure can be generated, though by a small amount, behind the extending part of each fin 57a, that is, under the second vent hole 57. As a result, the cooling performance of the sub radiator 40 can be enhanced by air discharge from the second vent hole 57 being promoted. In addition, also in this case, the air resistance that is applied to the front tire 32 can be reduced on the same principle as above.

Seventh Embodiment

A seventh embodiment differs from the first and fifth embodiments in that a vertical wall portion 68 and an inclined wall portion 69 formed in a lower wall portion 65 constitute a negative pressure generation part. The following description will focus on the difference from the first and fifth embodiments.

Figure 19:
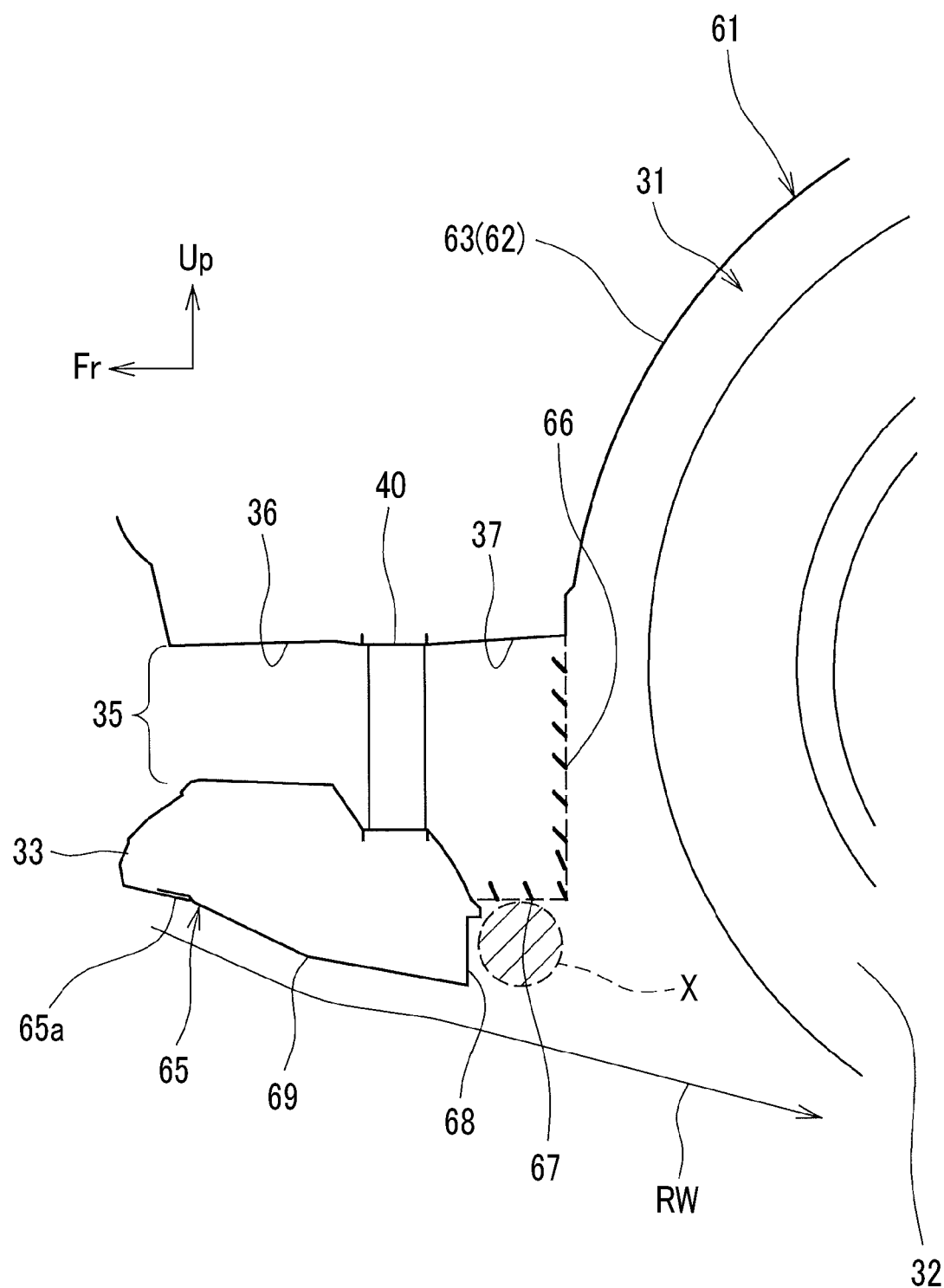
FIG. 19 is a sectional view schematically illustrating a fender liner structure according to a seventh embodiment of the disclosure.

As illustrated in FIG. 19, in a fender liner 61 according to the seventh embodiment, the vertical wall portion 68 and the inclined wall portion 69 are formed in the lower wall portion 65. The vertical wall portion 68 extends downwards from the vehicle front side of a second vent hole 67. The inclined wall portion 69 is inclined downwards from a tip portion 65a of the lower wall portion 65 toward the vehicle rear side and connected to the lower end of the vertical wall portion 68. In the seventh embodiment, the vertical wall portion 68 and the inclined wall portion 69 constitute the negative pressure generation part generating a negative pressure on the lower side of the second vent hole 67.

A liner body portion 62, a vehicle front side part 63, a first vent hole 66, the second vent hole 67, and so on are similar in configuration to the liner body portion 2, the vehicle front side part 3, the first vent hole 6, the second vent hole 7, and so on, and thus description thereof will be omitted.

In the seventh embodiment, a separate member such as the air spats 8 and the inclined member 18 is not used, and thus the number of parts can be reduced as in the sixth embodiment. As a result, an increase in weight and cost can be suppressed. As in the case of the inclined surface 18a according to the fifth embodiment, the traveling wind RW flowing through the lower side of the lower wall portion 65 can be smoothly flowed rearwards along the inclined wall portion 69 by the inclined wall portion 69 being disposed. As a result, further aerodynamic performance improvement can be achieved. A vortex is generated behind the vertical wall portion 68 (X portion in FIG. 19), that is, under the second vent hole 67 on the same principle as above, and thus the cooling performance of the sub radiator 40 can be improved.

Other Embodiments

The disclosure is not limited to the embodiments, and can be implemented in various other forms without departing from the spirit or main features thereof.

In the fourth embodiment, the slit 50 is combined with the relatively small first vent hole 26 disposed in the lower end portion of the vehicle front side part 23 of the liner body portion 22. However, the disclosure is not limited thereto. In an alternative example, the slit 50 may be combined with the relatively large first vent hole 6 as illustrated in the first embodiment.

In each of the above-described embodiments, the inlet ducts 36, 46 and the outlet ducts 37, 47 are disposed in front of and behind the sub radiator 40. However, the inlet ducts 36, 46 and the outlet ducts 37, 47 are optional and one or both thereof may be omitted.

In each of the above-described embodiments, the first vent holes 6, 16, 26, . . . and the second vent holes 7, 17, 27, . . . are continuously formed as if the first vent holes 6, 16, 26, . . . and the second vent holes 7, 17, 27, . . . are formed across the lower wall portion 5 and the vehicle front side part 3 of the liner body portion 2. However, the first vent holes 6, 16, 26, . . . and the second vent holes 7, 17, 27, . . . do not necessarily have to be continuous unless the first vent holes 6, 16, 26, . . . and the second vent holes 7, 17, 27, . . . are formed extremely far away.

In the second embodiment, the inlet duct 46 has a relatively small sectional area as the air intake port 45 is relatively small. The sub radiator 40 also may be relatively small.

The above-described embodiments are merely illustrative in all respects, and should not be interpreted restrictively. All variations and modifications falling within the equivalent scope of the claims are within the scope of the disclosure.

According to the aspects of the disclosure, a high level of aerodynamic performance improvement and a high level of cooling performance for a sub radiator can be achieved at the same time with design remaining intact and an increase in weight and cost suppressed. Accordingly, the disclosure is highly useful when applied to a fender liner structure in which a sub radiator is disposed in front of a fender liner.

What is claimed is:

1. A fender liner structure disposed in a wheel house of a front wheel of a vehicle including a sub radiator disposed in front of a fender liner, the fender liner structure comprising:
   a liner body portion curving in an arch shape to cover the front wheel from above, the liner body portion including a first vent hole penetrating a vehicle front side part of the liner body portion in a front-rear direction, the first vent hole provided with a plurality of fins guiding air, the plurality of fins inclined downwards toward a vehicle rear side, a lower end of the first vent hole extending to a lower end of the vehicle front side part; and
   a lower wall portion extending to the front of the vehicle from a lower end of the liner body portion on the vehicle front side, the lower wall portion including a second vent hole penetrating a vehicle rear side end portion of the lower wall portion in an upper-lower direction, a rear end of the second vent hole extending to the lower end of the vehicle front side part, the first vent hole and the second vent hole being continuously formed across the lower wall portion and the vehicle front side part of the liner body portion, and the lower wall portion including a negative pressure generation part configured to generate a negative pressure under the second vent hole.

2. The fender liner structure according to claim 1, wherein the first vent hole is formed in a lower end portion of the vehicle front side part of the liner body portion such that an upper end of the first vent hole is positioned lower than a center of the front wheel.

3. The fender liner structure according to claim 1, wherein:
the vehicle is provided with an air intake port taking in cooling air for the sub radiator in front of the sub radiator; and
a size of the air intake port is relatively smaller than in a case where the second vent hole is not formed.

4. The fender liner structure according to claim 1, wherein the liner body portion includes a third vent hole extending in the upper-lower direction through the liner body portion in an end portion of the vehicle front side part of the liner body portion on a vehicle width direction outer side of the vehicle.

5. The fender liner structure according to claim 1, wherein the negative pressure generation part includes air spats attached to a vehicle front side of the second vent hole beneath a lower surface of the lower wall portion and having a wind receiving plate extending downwards.

6. The fender liner structure according to claim 1, wherein the negative pressure generation part includes an inclined member attached to a vehicle front side of the second vent hole beneath a lower surface of the lower wall portion and having an inclined surface inclined downwards from the lower surface of the lower wall portion toward a vehicle rear side.

7. The fender liner structure according to claim 1, wherein:
the second vent hole includes a plurality of fins guiding air and inclined downwards toward a vehicle rear side; and
a part where the fin extends downwards beyond a lower surface of the lower wall portion constitutes the negative pressure generation part.

8. The fender liner structure according to claim 1, wherein:
the lower wall portion includes a vertical wall portion extending downwards from a vehicle front side of the second vent hole and an inclined wall portion inclined downwards from a tip portion of the lower wall portion toward a vehicle rear side and connected to a lower end of the vertical wall portion; and
the vertical wall portion and the inclined wall portion constitute the negative pressure generation part.

9. The fender liner structure according to claim 1, further comprising a duct disposed behind the sub radiator and guiding air to the first vent hole and the second vent hole after passage of the air through the sub radiator.

\* \* \* \* \*